United States Patent
Dean et al.

[19]

[11] Patent Number: 6,112,762
[45] Date of Patent: Sep. 5, 2000

[54] TOP OPERATED BOTTOM OUTLET VALVE ASSEMBLY

[75] Inventors: Robert H. Dean, Evanston; Krzysztof A. Pankiewicz, Elmwood Park, both of Ill.

[73] Assignee: Delaware Capital Formation, Inc., Wilmington, Del.

[21] Appl. No.: 09/220,827

[22] Filed: Dec. 24, 1998

Related U.S. Application Data

[63] Continuation-in-part of application No. 09/014,921, Jan. 28, 1998, abandoned.

[51] Int. Cl.[7] .............................. B65D 45/20; A01M 7/00
[52] U.S. Cl. .......................... 137/347; 137/350; 251/114; 251/279; 105/377.11
[58] Field of Search .................................. 251/114, 279, 251/144; 137/347, 348, 349, 350; 105/377.11

[56] References Cited

U.S. PATENT DOCUMENTS

| | | | |
|---|---|---|---|
| 114,361 | 5/1871 | Snyder et al. | 251/77 |
| 116,366 | 6/1871 | Snyder et al. | 251/77 |
| 390,533 | 10/1888 | Toepfer | 251/74 |
| 495,213 | 4/1893 | Adams et al. | 251/298 |
| 794,082 | 7/1905 | Crone | 138/89.3 |
| 1,339,083 | 5/1920 | Wood-Smith | 137/347 |
| 1,399,608 | 12/1921 | Garrett | 137/586 |
| 1,426,008 | 8/1922 | Posson | 137/585 |
| 1,458,816 | 6/1923 | Fyke et al. | 251/144 |
| 1,466,116 | 8/1923 | Campbell et al. | 137/586 |
| 1,472,293 | 10/1923 | Chatfield | 137/585 |
| 1,484,062 | 2/1924 | Conner | 220/318 |
| 1,523,484 | 1/1925 | Lindstrom | 137/586 |
| 1,534,137 | 4/1925 | Ostrander | 137/586 |
| 1,571,078 | 1/1926 | Whitney et al. | 137/586 |
| 1,579,267 | 4/1926 | Willoughby | 137/585 |
| 1,605,460 | 11/1926 | Ostrander | 137/585 |
| 1,606,191 | 11/1926 | Siebenmann | 251/74 |
| 1,619,054 | 3/1927 | Blest | 137/586 |
| 1,743,743 | 1/1930 | Wilder | 137/586 |
| 1,785,766 | 12/1930 | Callaway | 137/586 |
| 1,944,401 | 1/1934 | Callaway | 137/586 |
| 1,960,831 | 5/1934 | Shand | 137/561 R |
| 1,998,914 | 4/1935 | Wheaton | 137/72 |
| 2,384,972 | 9/1945 | Smalley | 210/106 |
| 2,813,694 | 11/1957 | Harmes et al. | 251/89 |
| 3,176,880 | 4/1965 | Archbold | 222/158 |
| 3,339,791 | 9/1967 | De Frees | 220/314 |

(List continued on next page.)

OTHER PUBLICATIONS

Literature of Salco Products entitled "Six Inch Quick–Connect Unloading Assembly" (prior to Sep. 1998).

*Primary Examiner*—A. Michael Chambers
*Attorney, Agent, or Firm*—Seyfarth Shaw

[57] ABSTRACT

A bottom valve assembly is provided for a tank car having a top portion, a bottom portion, and a manway disposed in the top portion. The assembly includes a valve seat disposed in the bottom portion of the tank car and defining an outlet opening and a plug moveable between closed and open positions relative to the outlet opening. In the closed position, the plug is disposed against a seat to form a substantially liquid-tight seal. The assembly also includes a link pivotally mounted to the manway, operating linkage coupled to the plug and pivotally coupled to the link, and a lever fixedly secured to the link. Movement of the lever causes the plug to be moved between the open and closed positions. The assembly may also include a latch for preventing movement of the plug from the closed position and a secondary linkage for moving the latch and to provide an indication at the manway of the plug position. The assembly may also include a secondary valve or closure communicating with the outlet opening and having a lever-operated outlet cap with slip-down and swing-away capability. In another embodiment, the assembly may include a stop mechanism for preventing the lever from moving in a plug-closing direction and a safety mechanism connected to the latch to provide structure for moving the latch when the secondary linkage is damaged.

27 Claims, 28 Drawing Sheets

U.S. PATENT DOCUMENTS

| | | | |
|---|---|---|---|
| 3,344,947 | 10/1967 | Gallup | 220/314 |
| 3,672,403 | 6/1972 | Wilson et al. | 138/89 |
| 3,698,592 | 10/1972 | Nelson | 220/323 |
| 4,000,703 | 1/1977 | Halliar | 105/377.11 |
| 4,014,367 | 3/1977 | Milo | 138/89 |
| 4,057,020 | 11/1977 | Halliar et al. | 105/377.11 |
| 4,457,349 | 7/1984 | Vazin | 141/86 |
| 4,676,573 | 6/1987 | Norman | 439/318 |
| 4,678,159 | 7/1987 | Gardner et al. | 251/107 |
| 4,819,827 | 4/1989 | DiSesa | 220/318 |
| 5,018,772 | 5/1991 | Obermeyer et al. | 292/39 |

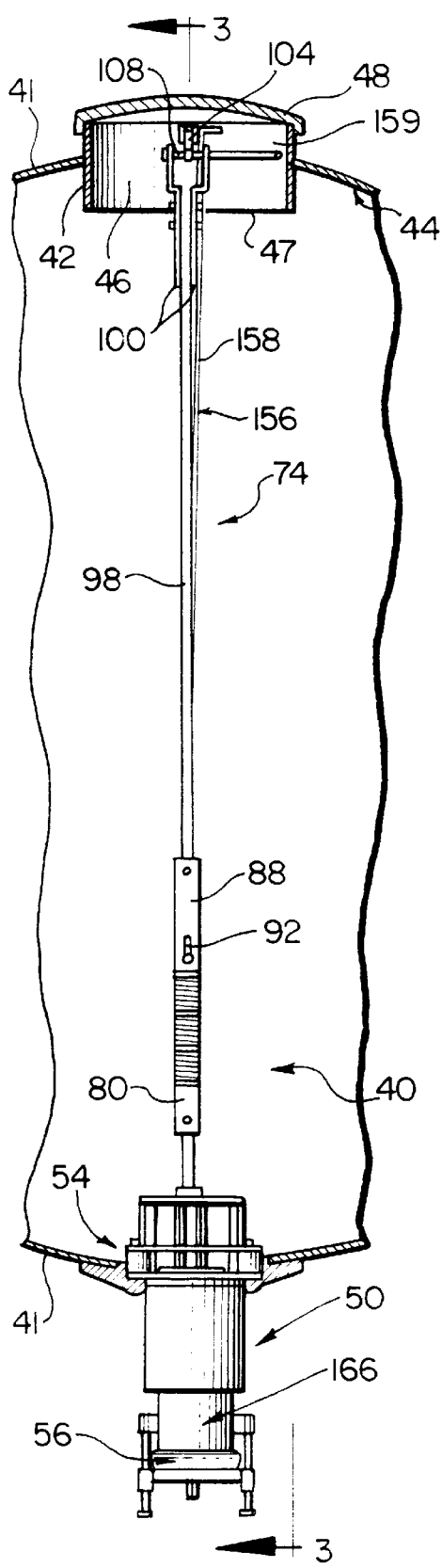
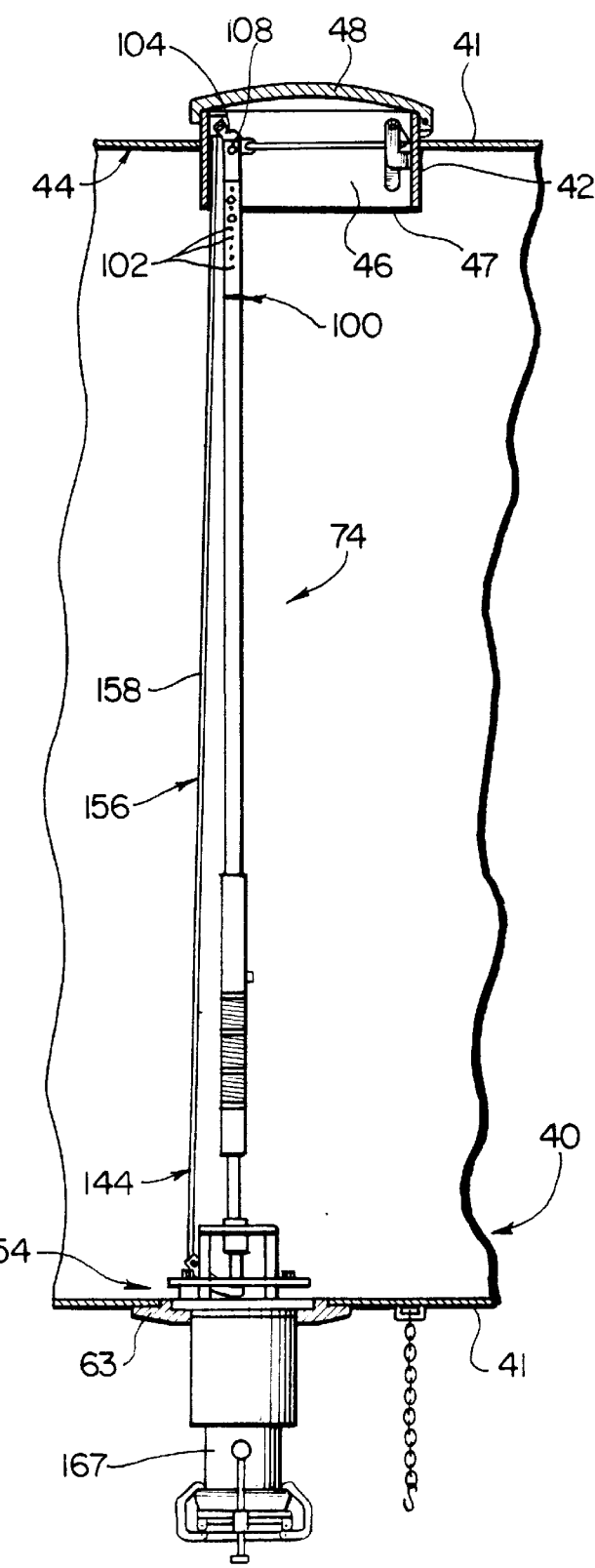

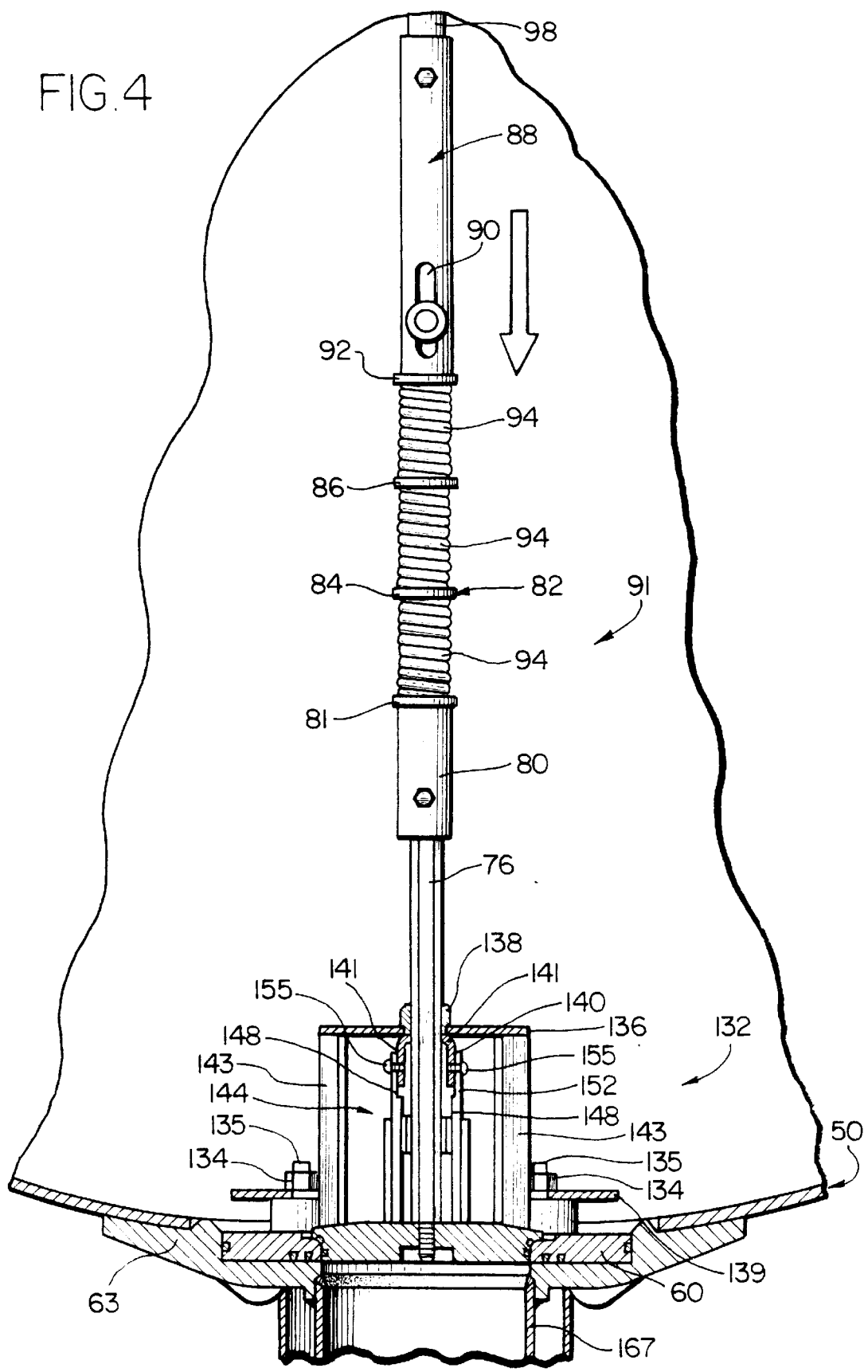

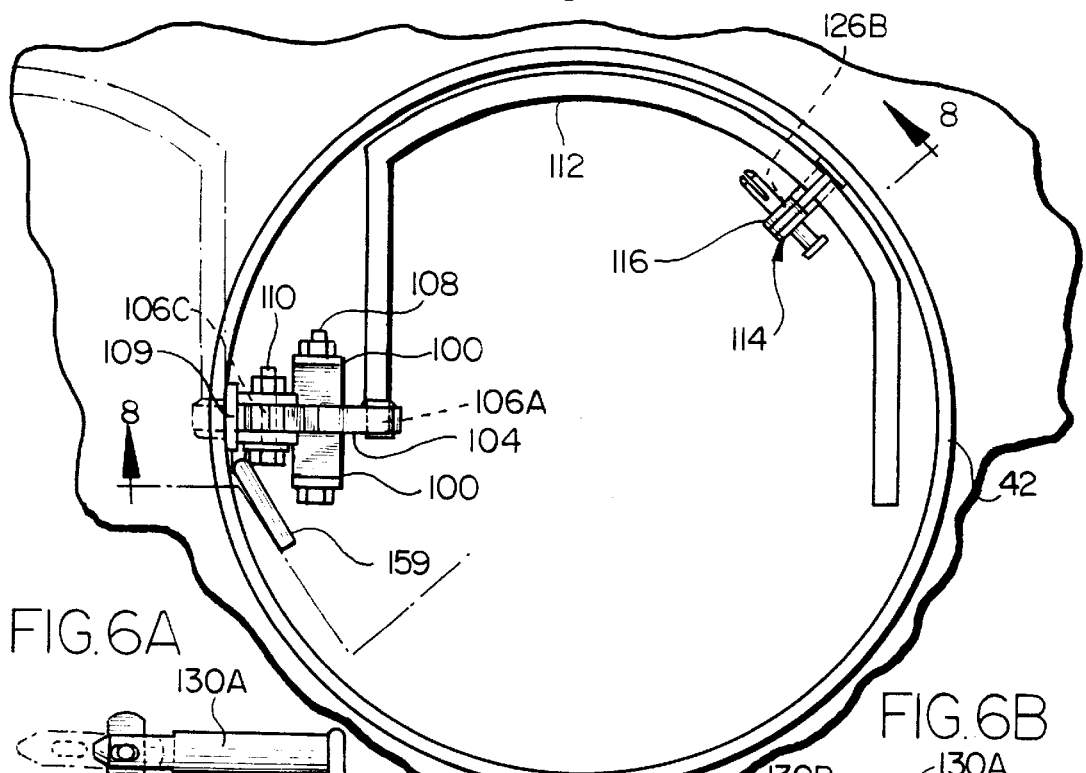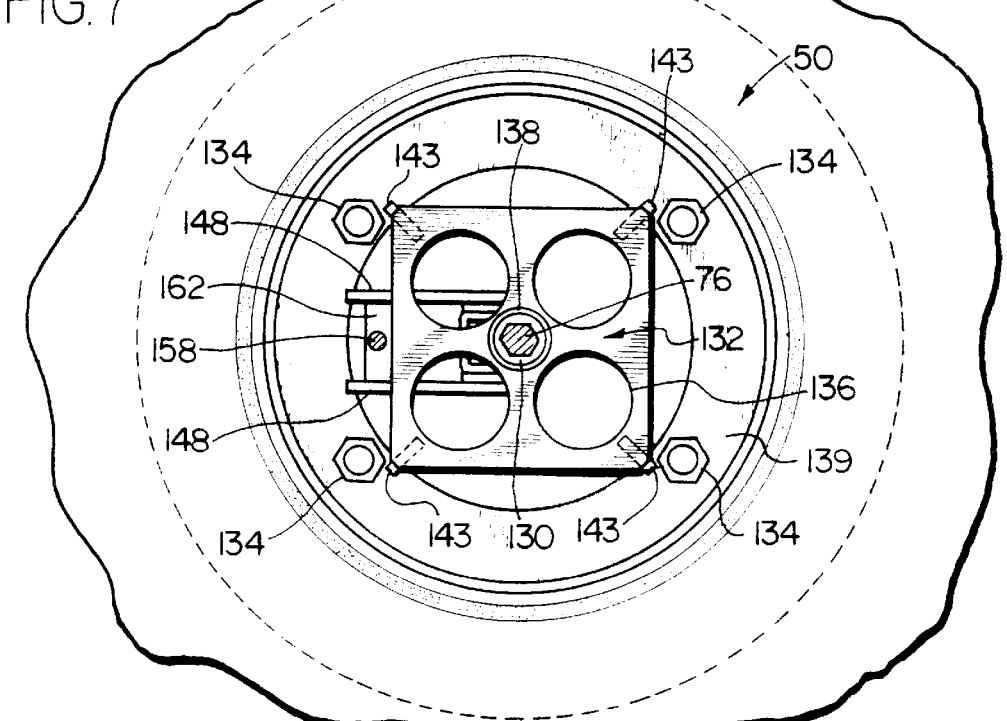

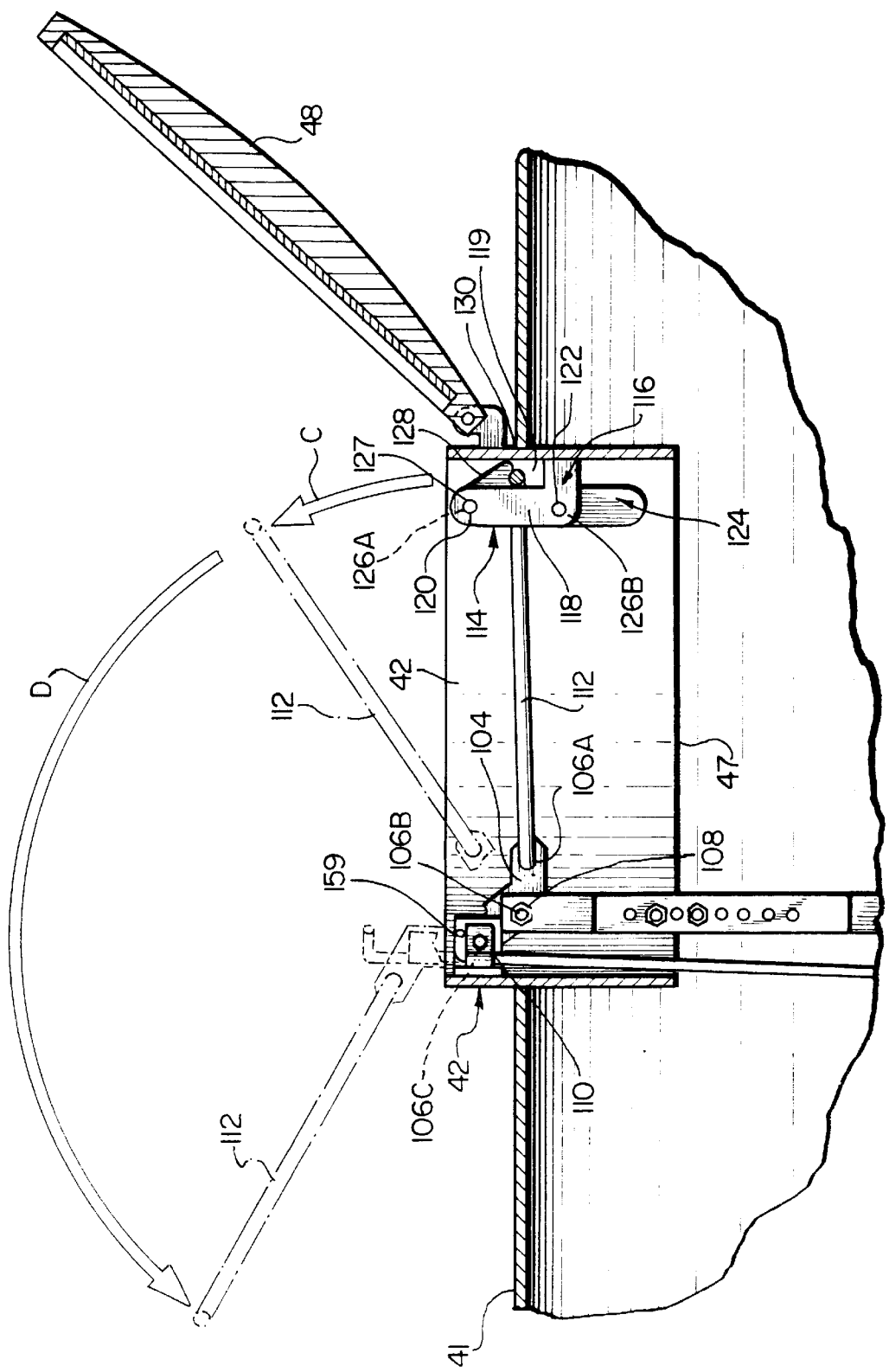

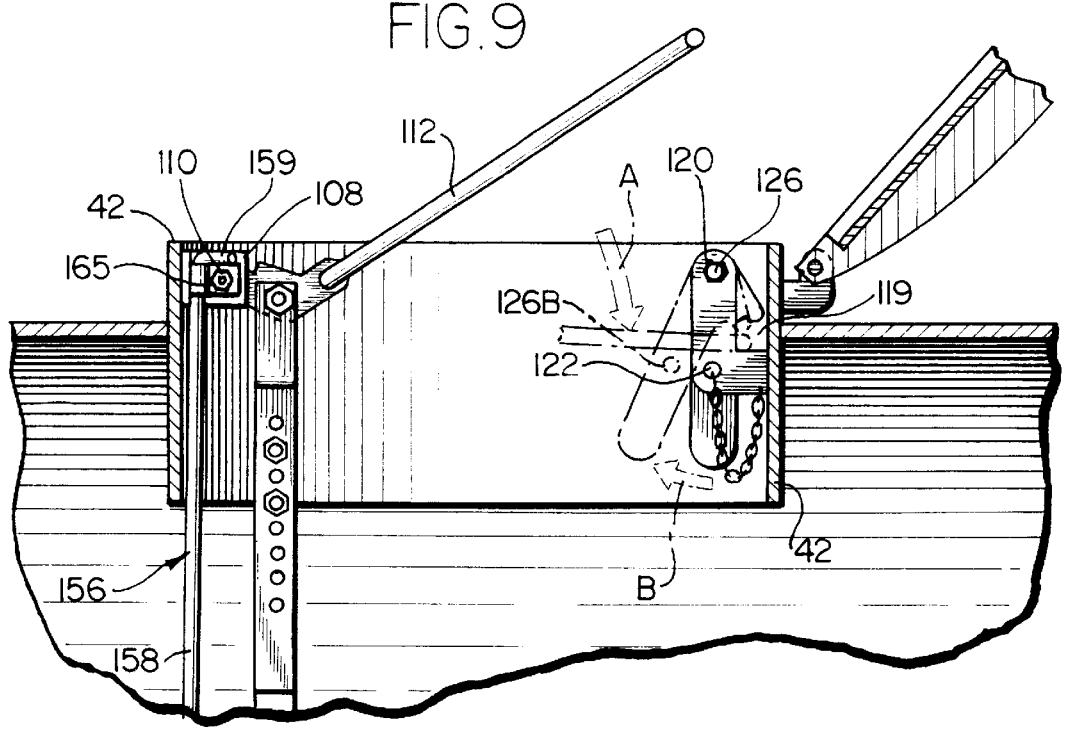
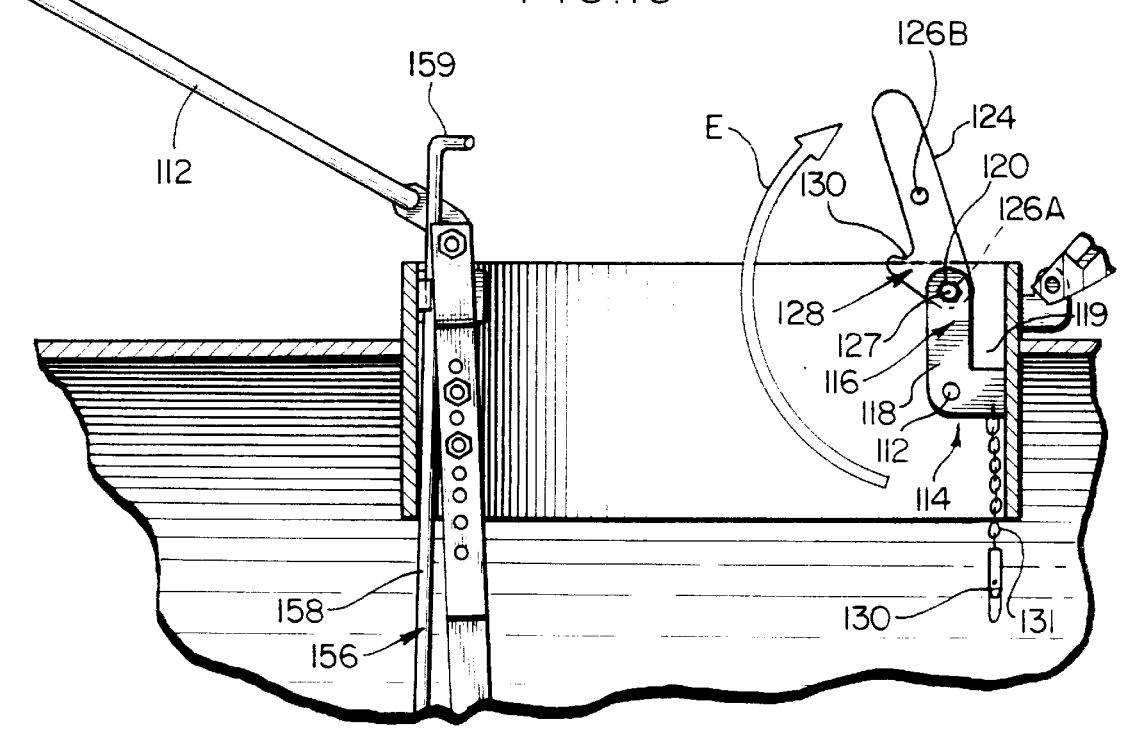

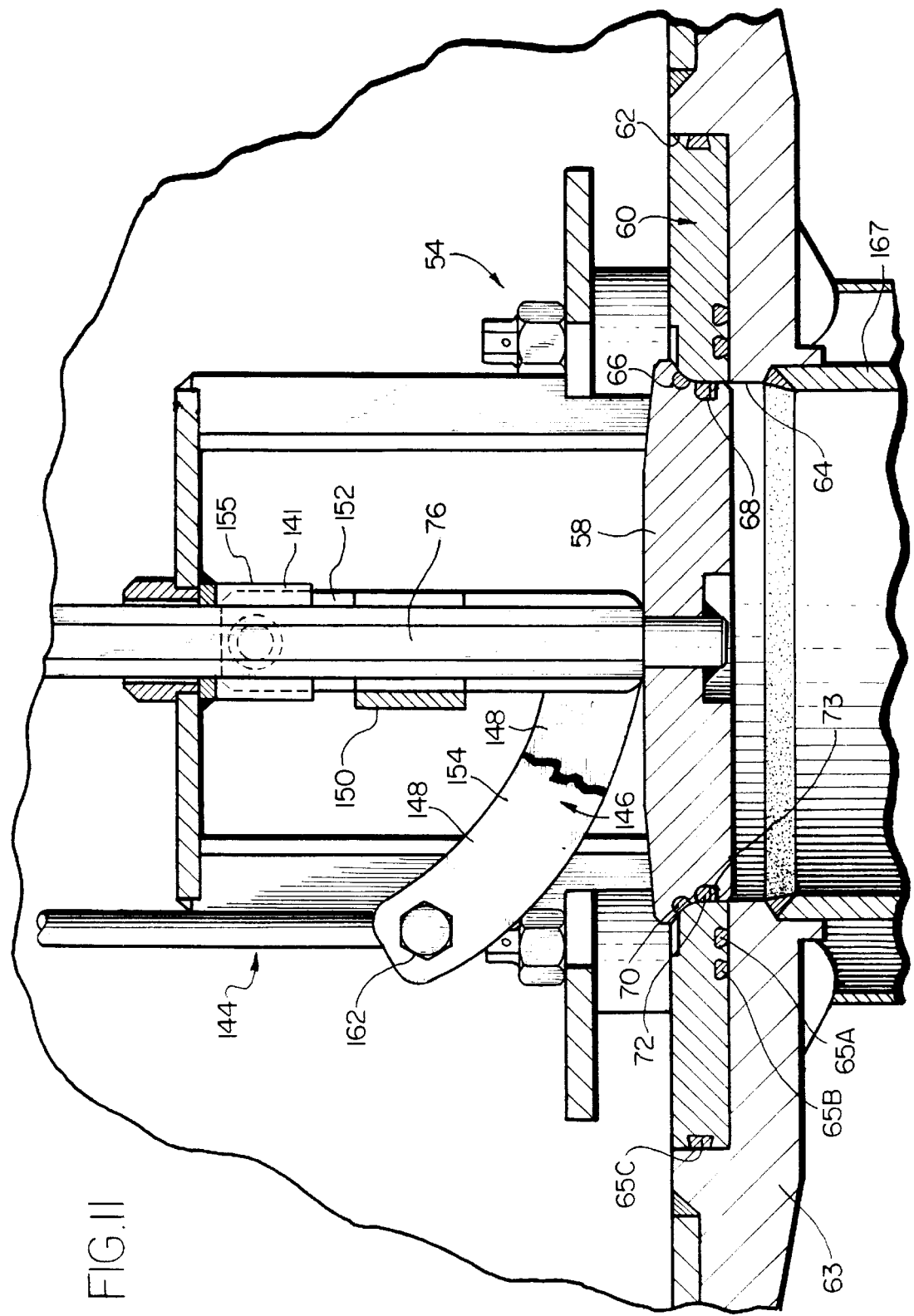

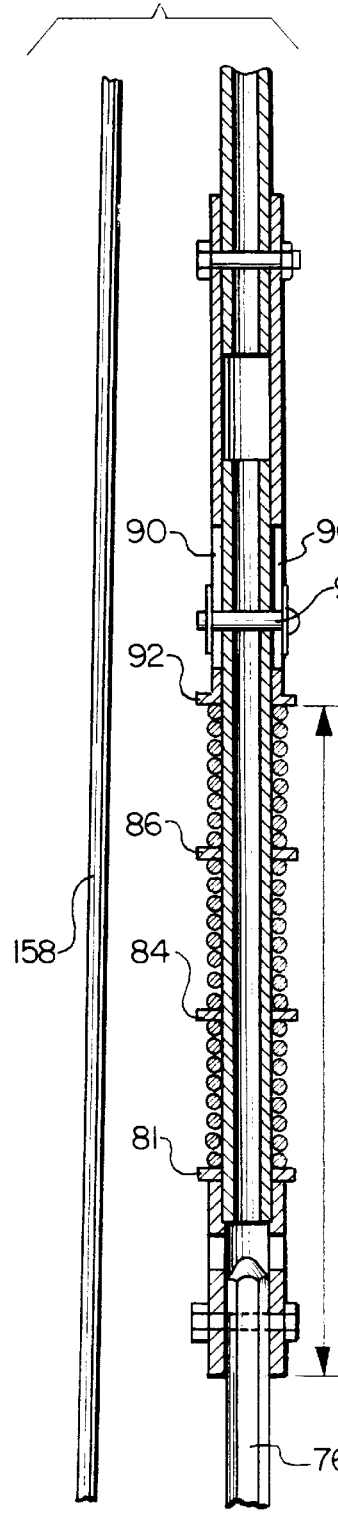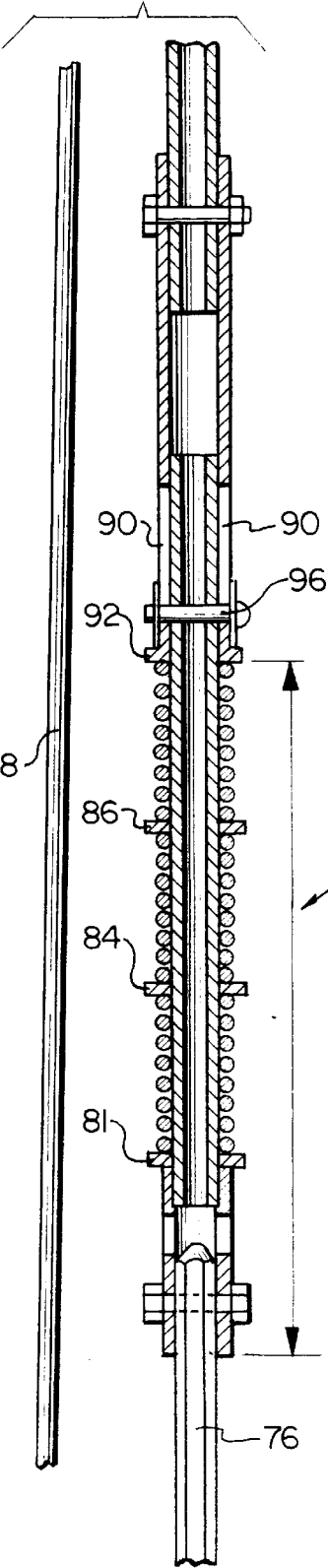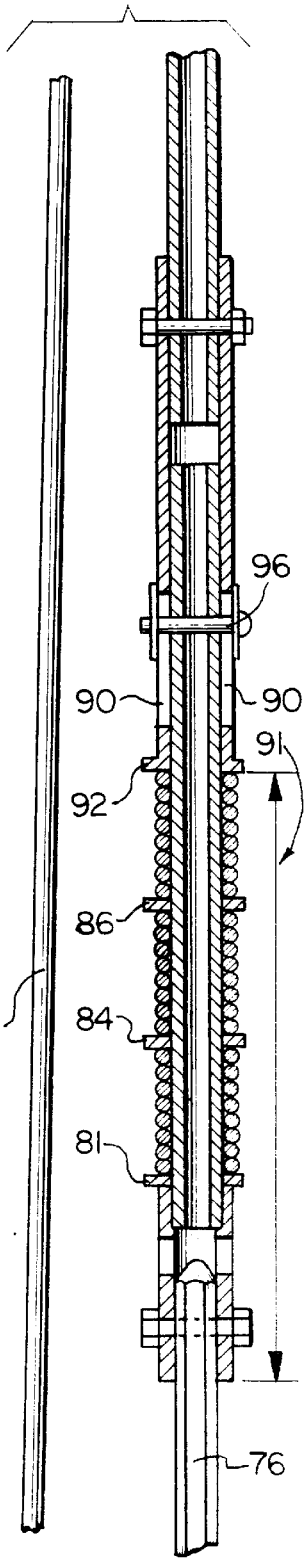

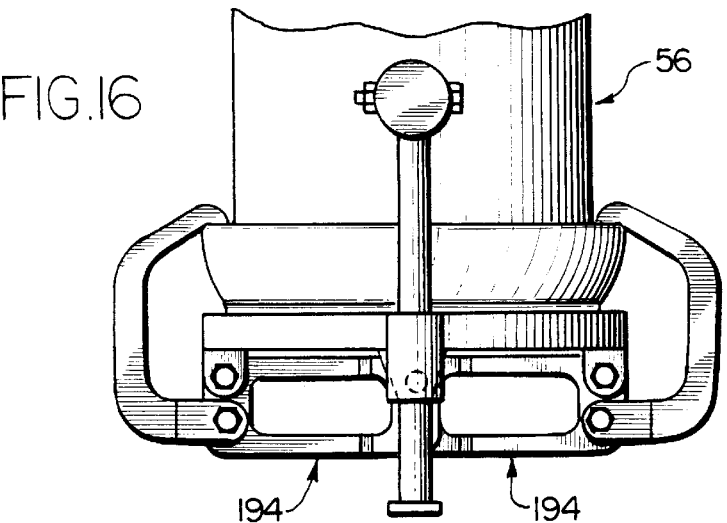
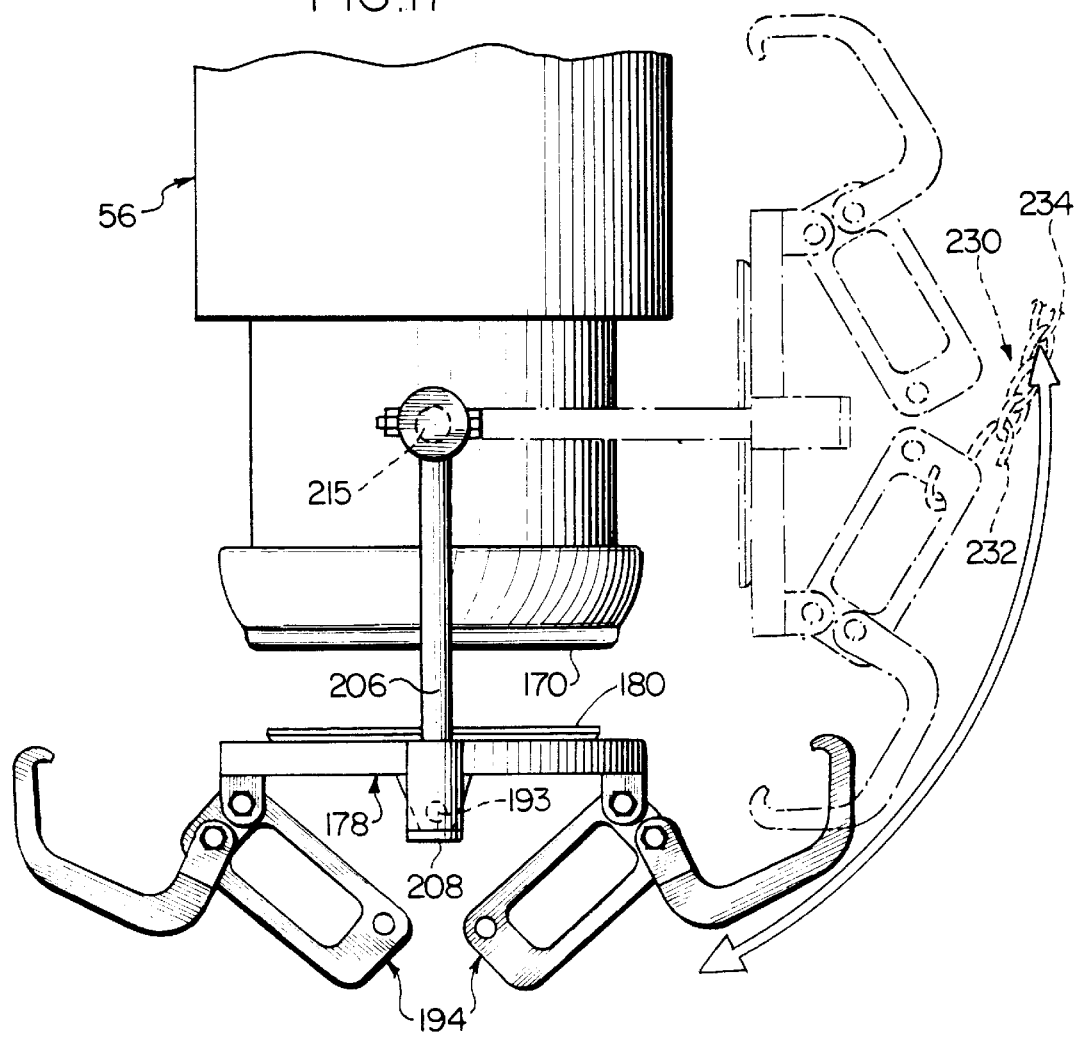

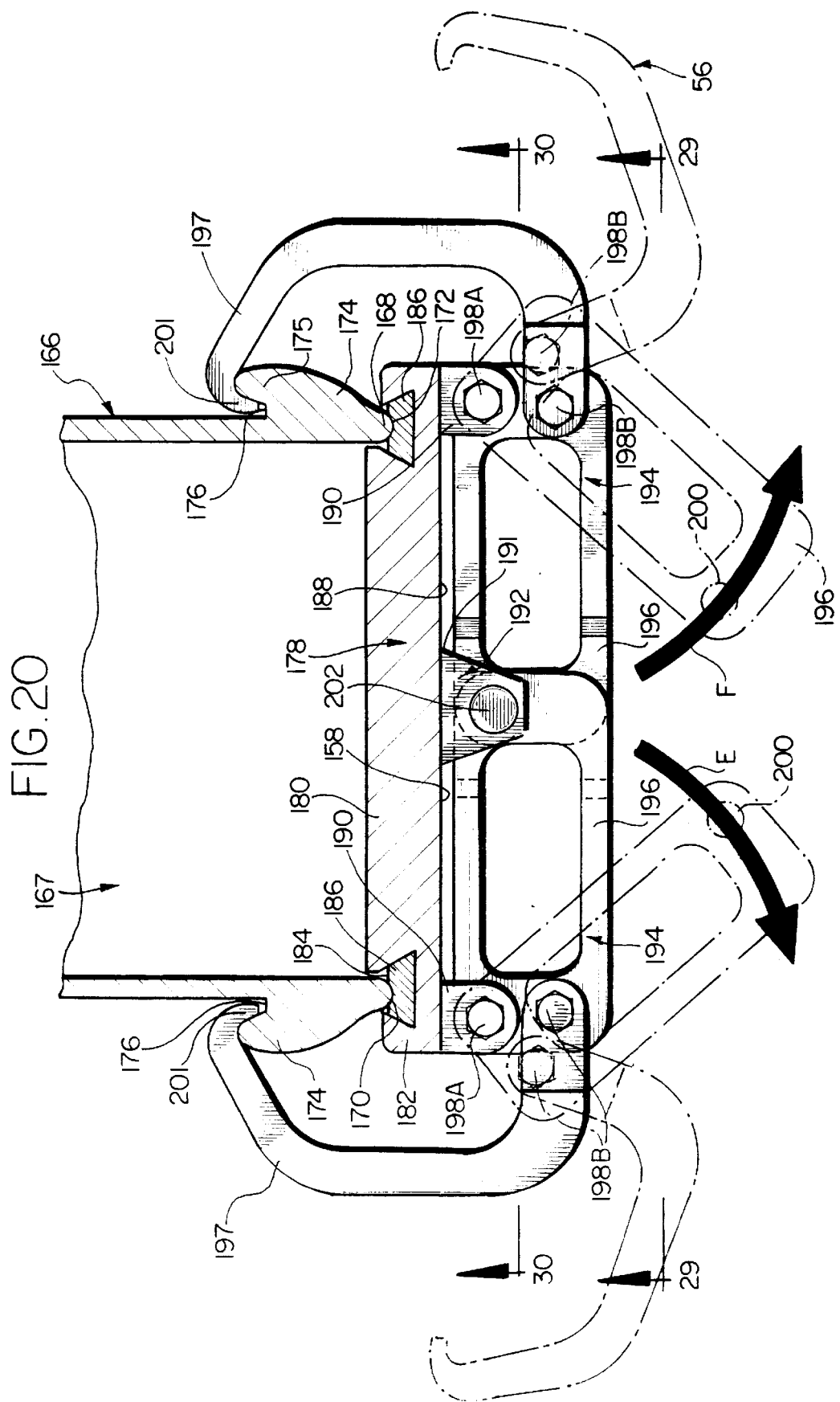

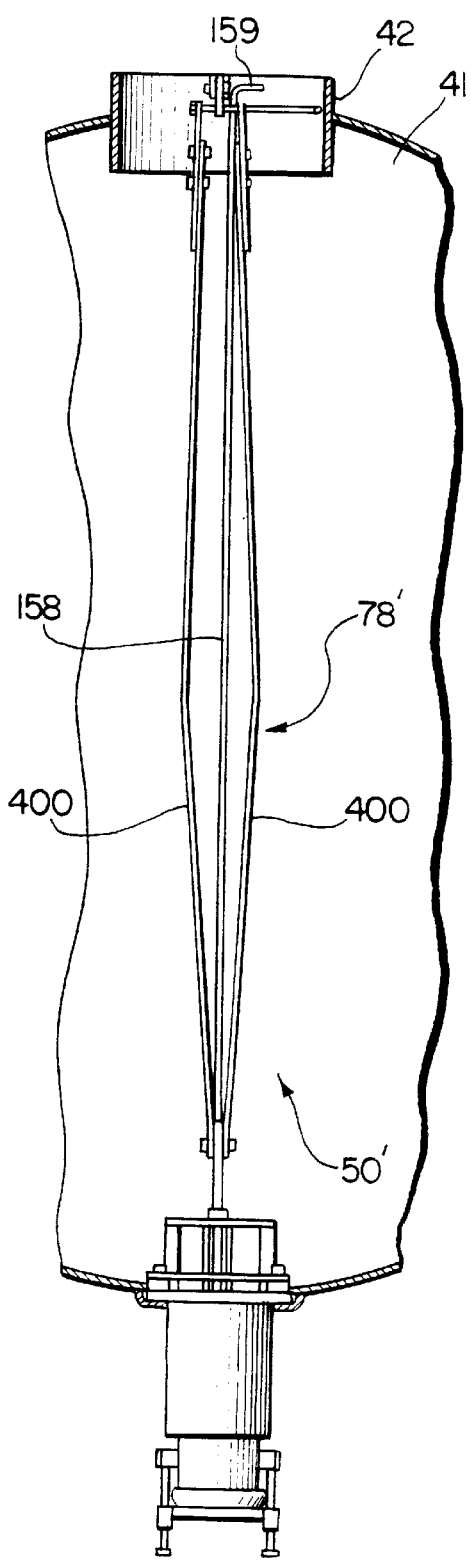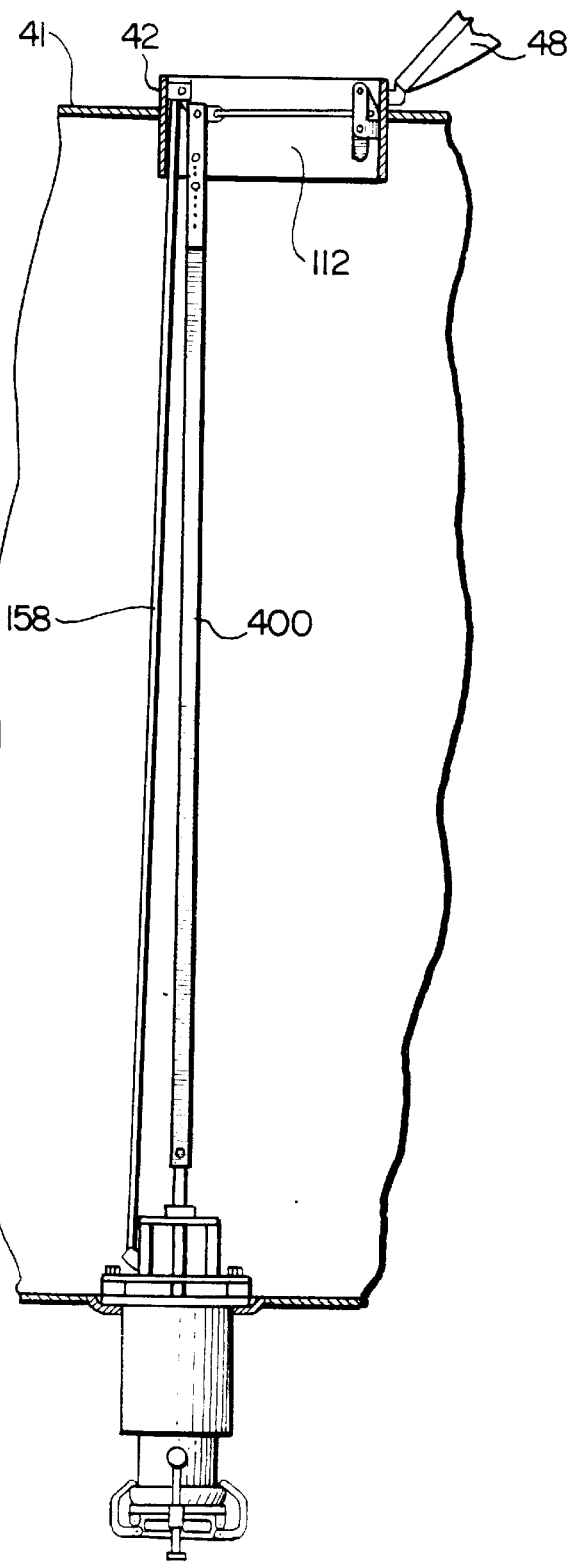

FIG. 23
FIG. 24
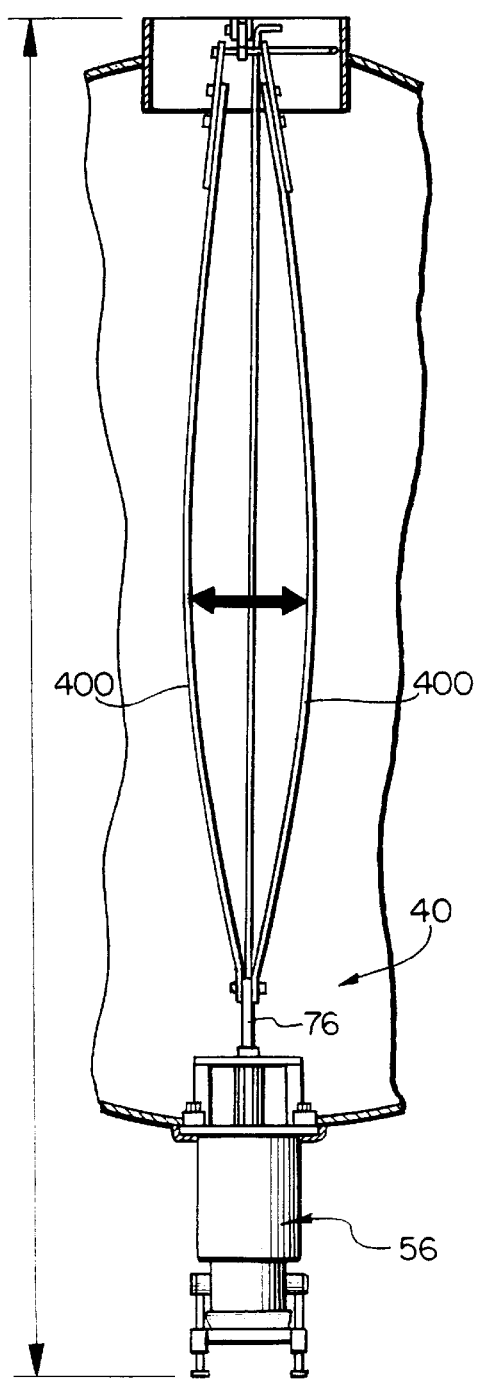
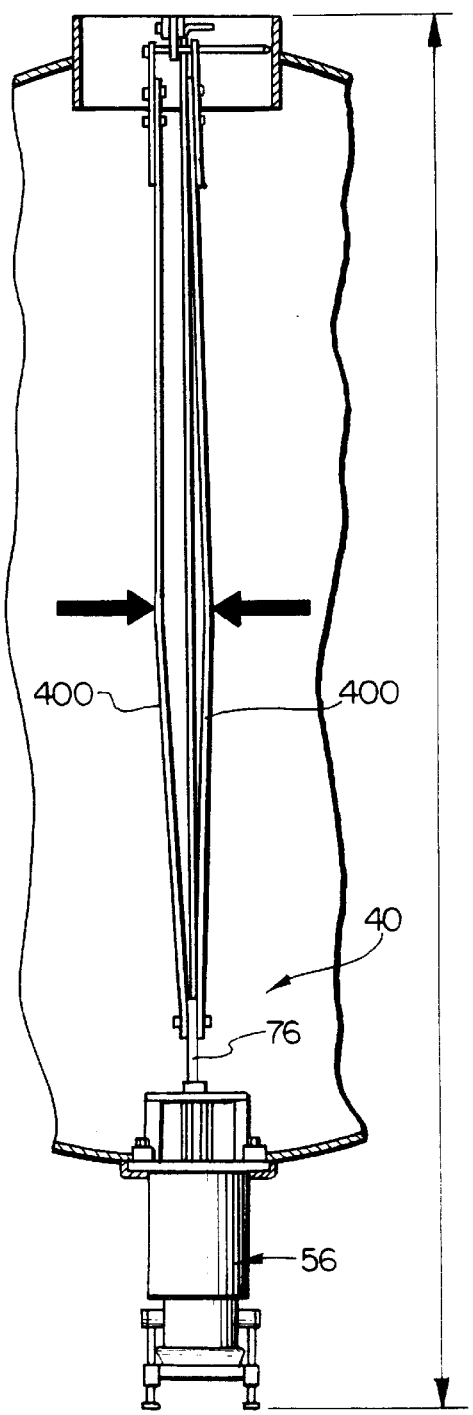

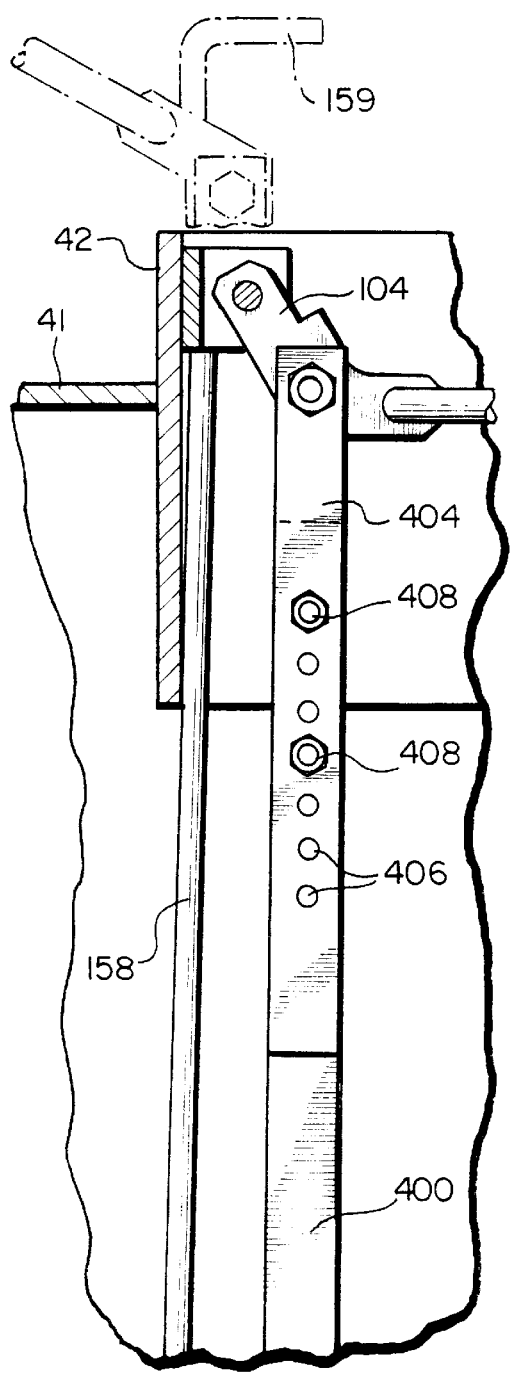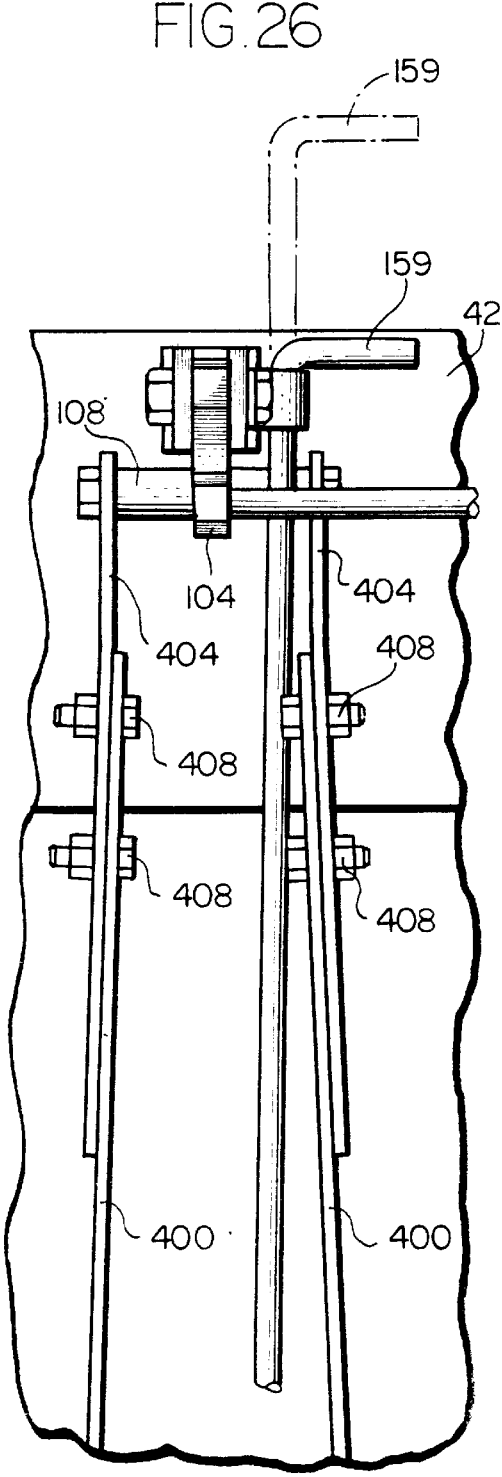

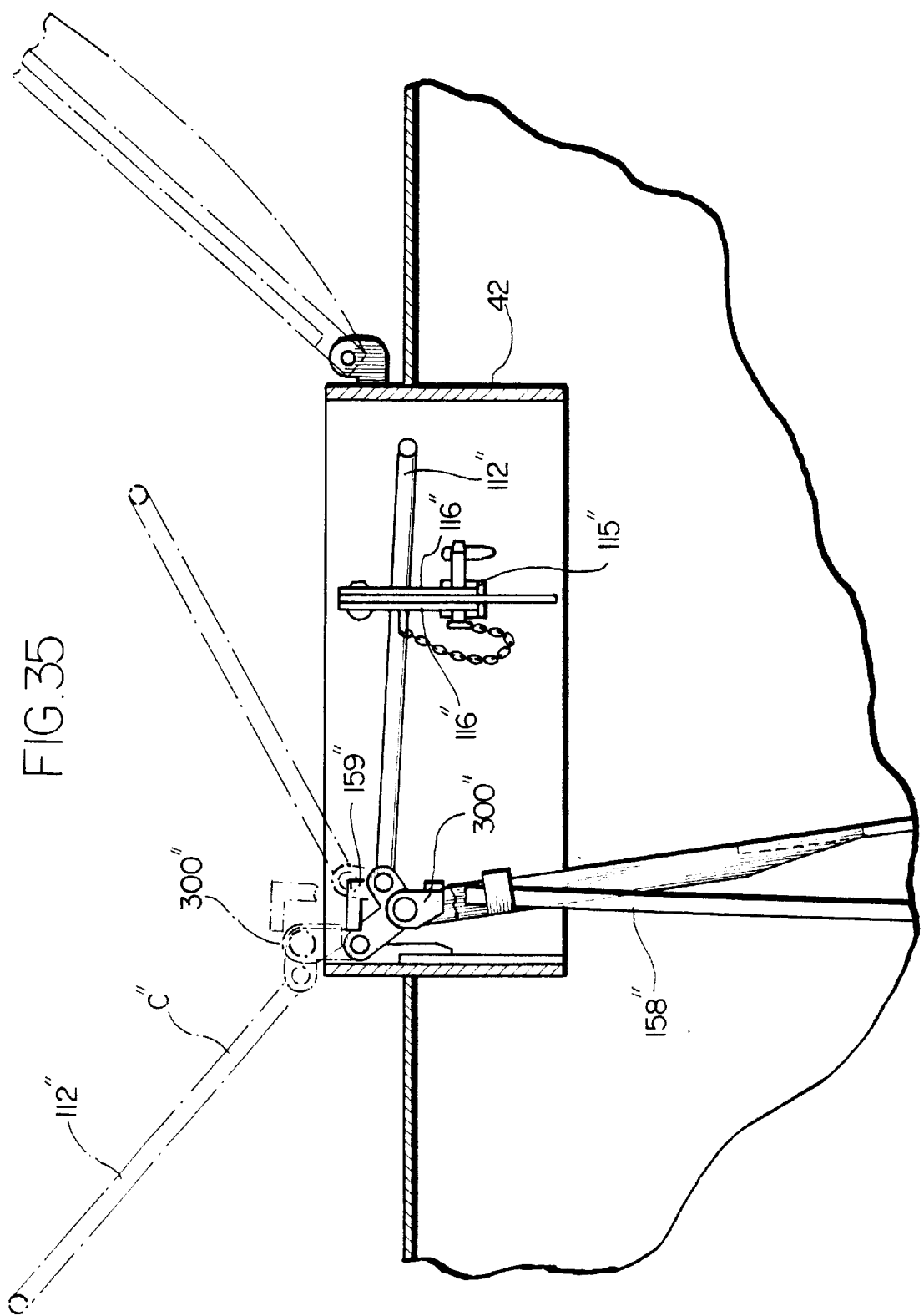

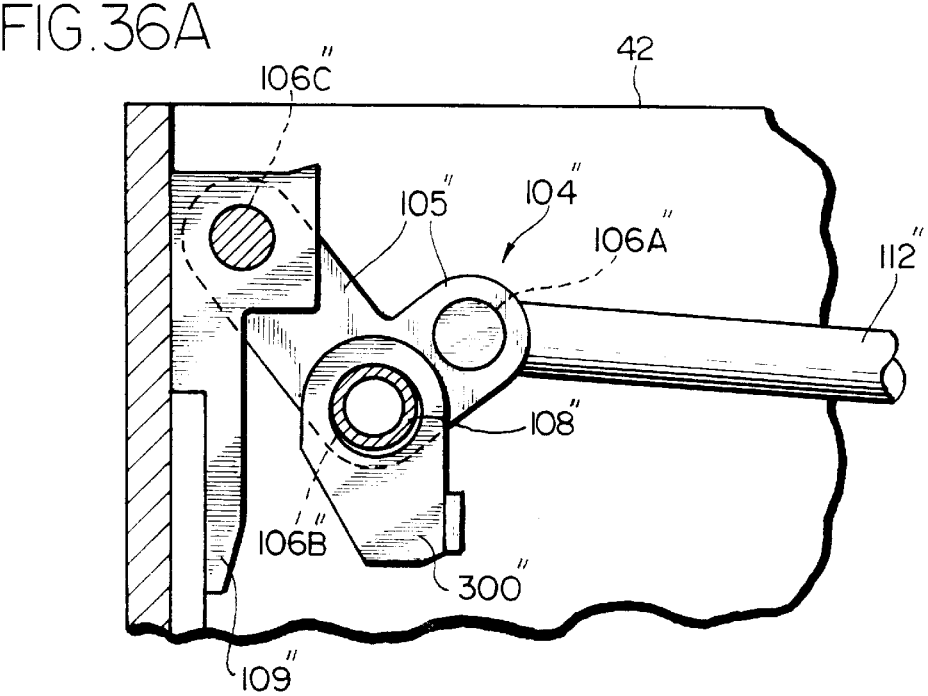
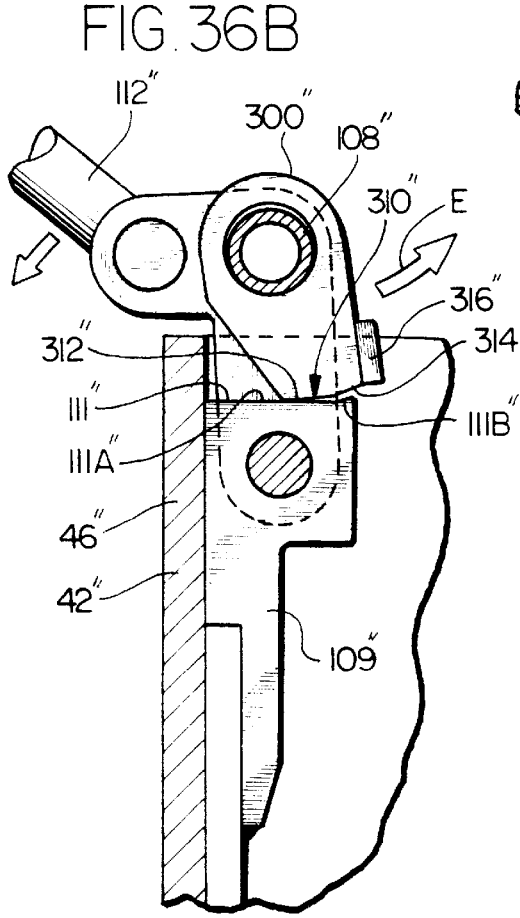
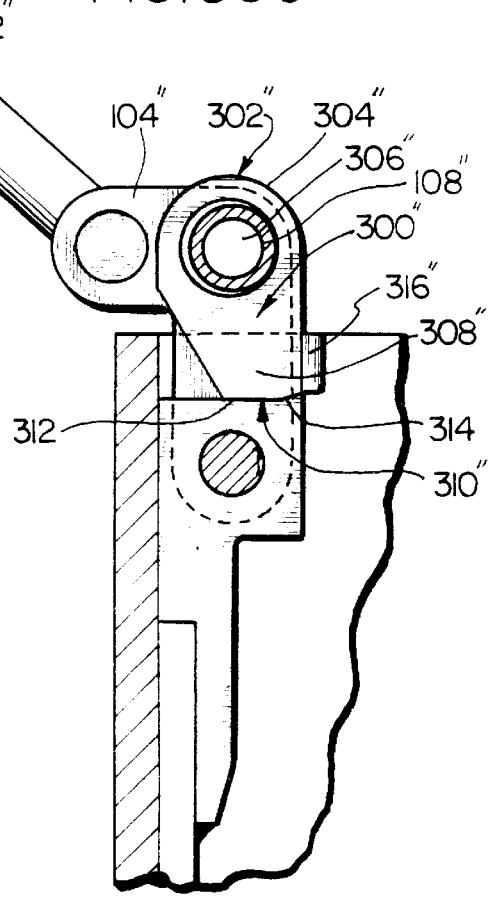

TOP OPERATED BOTTOM OUTLET VALVE ASSEMBLY

CROSS REFERENCE TO RELATED APPLICATION

This is a continuation-in-part of U.S. Ser. No. 09/014,921, filed Jan. 28, 1998 abandoned, and entitled "Top Operated Bottom Outlet Valve Assembly".

BACKGROUND OF THE INVENTION

1. Field of the Invention

This invention relates generally to valves, and in particular to valves for railway tank cars.

2. Description of the Prior Art

There have been several bottom valves for liquid tank cars (such as rail cars), having actuators located at the tops of the cars for operating the valves. These valves, however, have several disadvantages. Many of these valves have complex operating mechanisms which are time consuming and difficult to manufacture.

Additionally, often these valves are not totally safe because it is difficult, if not at times impossible, to determine from the top of the tank if these valves are properly seated. Improper seating of these valves could cause dangerous, unwanted leaks or spills, possibly leading to fires, or other damage, depending upon the liquid contained in the tank.

SUMMARY OF THE INVENTION

It is a general object of the invention to provide an improved tank bottom valve assembly which avoids the disadvantages of prior valves while affording additional structural and operational advantages.

An important feature of the invention is the provision of a tank car bottom valve assembly which is of a relatively simple and economical construction.

Another feature of the invention is the provision of a valve assembly of the type set forth which can both be opened at the top of the tank and provide an indication at the top of the tank that the valve has been properly seated.

A still further feature of the invention is the provision of an assembly of the type set forth which can accommodate dimensional changes of the tank car diameter in use while maintaining the valve in its closed position.

Another feature of the invention is the provision of an assembly of the type set forth is to provide the ability to open the valve from the manway of the tank car while allowing access for the passage of users and equipment through the manway.

Yet another feature of the invention is the provision of an assembly of the type set forth which can prevent the valve from being accidently opened or closed.

A further feature of the invention is the provision of an assembly of the type set forth which includes structure to open the valve if the valve assembly becomes damaged.

Certain ones of these and other features of the invention may be attained by providing a bottom valve assembly for a tank car having a top portion, a bottom portion and a manway disposed in the top portion. The assembly includes a valve seat disposed in the bottom portion of the tank car and defining an outlet opening and a plug moveable between closed and open positions relative to the outlet opening. In the closed position, the plug is disposed against the seat to form a substantially liquid-tight seal. The assembly also includes a link pivotally mounted to the manway, operating linkage coupled to the plug and pivotally coupled to the link, and a lever fixedly secured to the link, wherein movement of the lever causes the plug to be moved between the open and closed positions.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 2 is an enlarged, fragmentary, transverse, sectional view taken generally along line 2—2 of FIG. 1;

FIG. 3 is a fragmentary, longitudinal sectional view taken generally along lines 3—3 in FIG. 2;

FIG. 4 is a further enlarged, fragmentary view of a lower portion of FIG. 2, illustrating a portion of the operating linkage, poppet and seat of the invention;

FIG. 6 is an enlarged top plan view of a portion of the operating mechanism of the present invention;

FIG. 6A is an enlarged side elevation view of the swing pin shown in FIG. 6;

FIG. 6B is a top plan view of the swing pin shown in FIG. 6A;

FIG. 7 is a sectional view taken generally along line 7—7 of FIG. 5;

FIG. 8 is a sectional view taken generally along line 8—8 of FIG. 6 and showing the manway cover;

FIG. 9 is a view similar to FIG. 8, illustrating the lever in an unlocked condition;

FIG. 10 is a view similar to FIG. 8 illustrating the lever in an unlocked condition when the poppet is in an open position;

FIG. 11 is a further enlarged view of the lower portion of FIG. 5, illustrating the poppet in the closed position and the latch in a locked position;

FIGS. 13–15 are fragmentary sectional views, which illustrate the variable length portion of the linkage structure coupled to the primary valve, shown in different conditions;

FIG. 16 is an enlarged, fragmentary side elevation view illustrating the secondary valve of FIG. 3 in a closed position;

FIG. 17 is a view similar to FIG. 16, illustrating the secondary valve in an opened position;

FIG. 20 is an enlarged, sectional view taken generally along line 20—20 of FIG. 18;

FIG. 21 is a sectional view similar to FIG. 2 of a second embodiment;

FIG. 22 is a sectional view similar to FIG. 3 of the embodiment of FIG. 21;

FIGS. 23 and 24 are views similar to FIG. 21, respectively showing the operating linkages in compressed and expanded states;

FIGS. 25 and 26 are, respectively, enlarged views of portions of the operating mechanisms illustrated in FIGS. 21 and 22;

FIG. 35 is a reduced, fragmentary, sectional view taken generally along line 35—35 of FIG. 33;

FIGS. 36A–C are enlarged, fragmentary, sectional views of the left-hand portion of FIG. 35, illustrating the operation of the stop mechanism to maintain the operating lever in an open position;

DETAILED DESCRIPTION OF THE PREFERRED EMBODIMENTS

Figure 1:
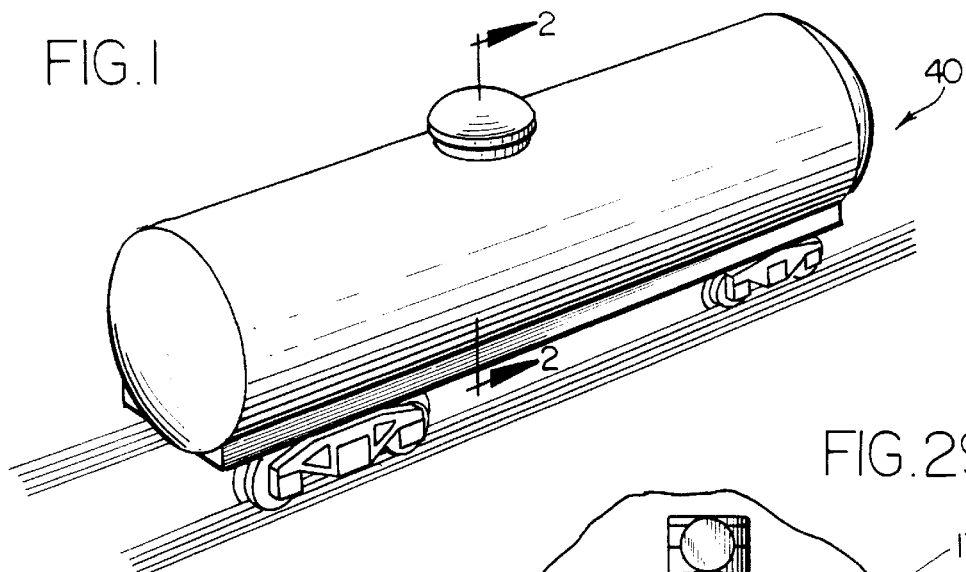
FIG. 1 is a perspective view of a railway tank car embodying the present invention.

Referring to FIG. 1, a tank car 40, such as a rail car, for transporting liquids is illustrated. As seen in FIGS. 2–3, the tank car 40 has a cylindrical sidewall 41 and a manway 42 disposed in the sidewall 41 centrally of a top portion 44 of the tank car 40. The manway 42 is formed by cylindrical wall 46 having a bottom edge 47. A manway cover 48 is pivotally attached to the exterior surface of the wall 46. The tank car 40 includes a bottom outlet valve assembly 50.

The bottom outlet valve assembly 50 includes a primary valve 54 disposed essentially within the sidewall 41 and a secondary valve or closure 56 disposed essentially outside the sidewall 41. As best seen in FIG. 11, the primary valve 54 includes a substantially circular plug 58, and a flange 60 disposed in a recess 62 in a saddle 63 fixed to the sidewall 41, and cooperates with the saddle 63 to define circular outlet opening 64. Three o-rings 65A, B, C sit in recesses of the flange 60 to effectuate a liquid tight seal between the flange 60 and saddle 63. As discussed below, the flange 60 is fixed to the saddle 63 in a known manner. The saddle 63 is designed to provide reinforcement for the opening 64 in sidewall 41 per AAR standards. Flange 60 defines a valve seat for the plug 58 to seat with and form a liquid-tight seal therebetween. In that regard, the plug 58 includes two annular grooves 66, 68, respectively seating o-rings 70 and 72, and a wiper 73 disposed in the groove 68 to effectuate the liquid-tight seal. When the plug 58 is seated on the flange 60 and a liquid-tight seal is achieved therebetween, the plug 58 is in a closed position closing the outlet opening 64. Otherwise, it is in an open position.

Figure 5:
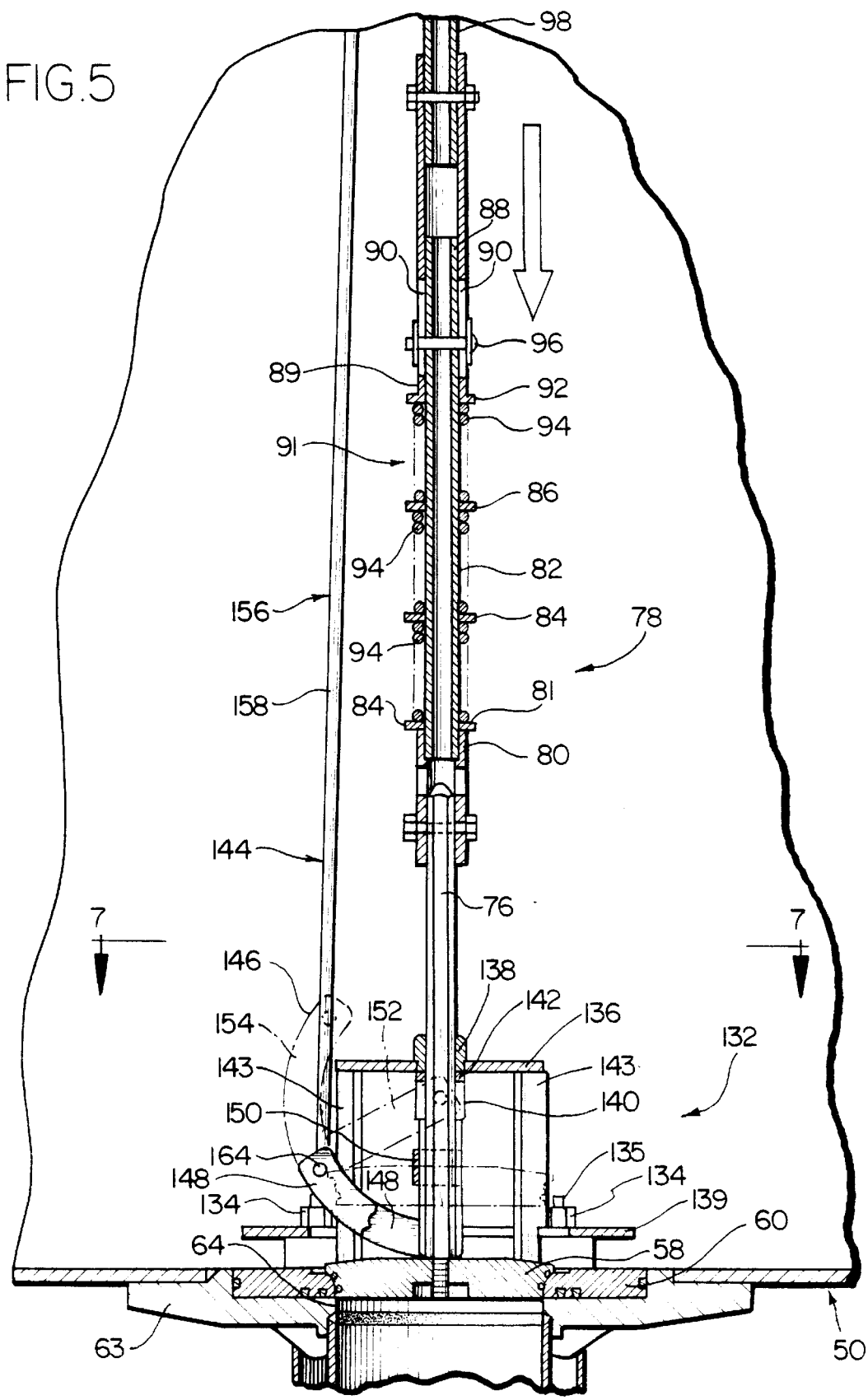
FIG. 5 is a further enlarged, fragmentary view of a lower portion of FIG. 3.

Referring to FIGS. 2 and 3, the valve assembly 50 includes an operating mechanism 74 for opening and closing the primary valve 54 (i.e., moving the plug 58 between its open and closed positions). Referring to FIG. 5, the operating mechanism 74 includes a plug stem 76 connected to the center of the plug 58. The operating mechanism 74 also includes a linkage structure 78 coupled to the plug stem 76.

The linkage structure 78 includes a lower tube 80 bolted to the plug stem 76, a washer 81 disposed at the upper end of the plug stem 76, and an intermediate tube 82 coaxially received within and connected to the upper end of the lower tube 80. The intermediate tube 82 is encircled by two washers 84, 86. The linkage structure 78 also includes an upper tube 88 having a lower end 89 in which the upper end of the intermediate tube 82 is telescopically received. The upper tube 88 includes two diametrically opposed, axially extending slots 90 therein and a radially outwardly extending annular projection 92 at its lower end 89. Three coil springs 94 are disposed about intermediate tube 82. The springs 94 are respectively disposed between annular projection 92 and washer 86, between washers 86 and 84, and between washer 84 and washer 81. (Alternatively, the three coil springs 94 and washers 84 and 86 could be replaced with a single longer spring.) The springs 94 bias the upper tube 88 and the lower tube 80 apart. A bolt 96 is disposed diametrically through intermediate tube 82 and through slots 90 to limit axial movement of upper tube 88 relative to intermediate tube 82. As discussed below, intermediate tube 82, upper tube 88 and springs 90 form a variable-length portion 91 of the linkage structure 78.

Linkage structure 78 also includes an elongated tubular rod 98 bolted at its lower end to upper tube 88 and, as shown in FIG. 2, two brackets 100 bolted to the upper end of the tubular rod 98. As shown in FIG. 3, each bracket 100 has a plurality of axially spaced holes 102 for length adjustment purposes. (Alternatively, the bottom of lower tube 80 may include a plurality of axially spaced adjustment holes and brackets 100 and rod 98 can be an integral unit welded together.)

As seen in FIGS. 3, 6 and 8–10, the operating mechanism 74 also includes a generally L-shaped link 104 having three apertures 106A–C. The linkage structure 78 is pivotally coupled to the L-shaped link 104 by a bolt 108 passing through associated top holes of the brackets 100 and the aperture 106B of L-shaped link 104.

Manway 42 includes a U-shaped bracket 109 having a pair of aligned holes. As seen best in FIG. 6, the L-shaped link 104 is pivotally mounted to the manway 42 by a bolt 110 disposed through the holes of the U-shaped bracket 109 and aperture 106C at an end of the L-shaped link 104.

As seen in FIG. 6, the operating mechanism 74 also includes a moveable, generally C-shaped lever 112 fixedly connected to an end of the L-shaped link 104 and thereby coupling the C-shaped lever 112 to the plug 58. As discussed further below, movement of the C-shaped lever 112 causes the plug 58 to be moved between its open and closed positions. The C-shape of lever 112 allows it to lie along the wall of manway 42 so as to minimize obstruction.

As seen in FIGS. 6, 8, 9, and 10, a stop latch 114 is mounted to the manway 42 to trap the lever 112 and prevent it from moving in a valve-opening direction. The stop latch 114 includes a clevis bracket 116 having two L-shaped legs 118 mounted to the manway 42 and cooperating therewith to form a recess 119 therebetween. Each of the legs 118 has aligned upper and lower apertures 120, 122. The stop latch 114 also includes a catch 124 having upper and lower apertures 126A and 126B. A bolt 127 is disposed through the aperture 126A of the catch 124 and the upper apertures 120 of the legs 118 to pivotally couple the catch 124 to the bracket 116. The catch 124 also includes a hook projection 128 forming an arcuate recess 129.

As seen in FIGS. 6 and 8, to latch the lever 112 it is pushed down into the recess 119, against the urging of springs 94. The lever 112 will cam past the projection 128 of the catch 124, which will then swing back by gravity over the lever 112, trapping it in the recess 129. The stop latch 114 is then in a locked condition. The stop latch 114 is maintained in the locked condition by a swing pin 130 disposed through lower aperture 126B. As seen in FIGS. 6A and 6B, the swing pin 130 has a main portion 130A having a first axis and coupled to a moveable portion 130B having a second axis and which is moveable with respect to the first axis. When the moveable portion 130B is coaxially aligned with the first axis, the swing pin 130 can be removed from lower aperture 126B, otherwise it remains in place. The swing pin 130B is coupled to a chain 131 which is welded to bracket 116. To unlock the C-shaped lever 112, the swing pin 130 is removed from lower aperture 126B, the C-shaped lever 112 is then pushed down in the direction of arrow A (FIG. 9) towards the plug 58 to provide clearance beneath the catch 124, which is then rotated, as seen in FIG. 10, clockwise as indicated by arrow E, allowing the C-shaped lever 112 to be moved in a counterclockwise direction, as indicated by arrows C and D of FIG. 8, out of the recess 119 to open the plug 58.

As seen in FIGS. 4, 5, 7, 11 and 12, the bottom outlet valve assembly 50 also includes a guide assembly 132 coupled to the saddle 63 by four nuts 134 and four studs 135. Each stud 135 passes through a bushing 137. The guide assembly 132 includes an upper plate 136 having a guide 138 at its center. The guide assembly 132 also includes a circular lower plate 139, and four vertical bars 143 resting on the flange 60 and connecting and supporting the upper and lower plates 136, 139. The plug stem 76 is disposed through the guide 138, which aids in guiding the plug 58 (coupled to the plug stem 76) to the outlet opening 64 for proper seating with respect thereto. The guide assembly 132 also includes a U-shaped bracket 140 having a bight welded to the underside of upper plate 136 and two depending arms 141, the bight having an aperture 142 through which the plug stem 76 is disposed. The studs 135 also couple the flange 60 to the saddle 63. The studs 135 are threadedly coupled to threaded apertures (not shown) in the flange 60 and saddle 63. Four nuts (not shown) are disposed in the bushings 137 and are tightened to fasten the flange 60 to the saddle 63.

The bottom outlet valve assembly 50 also includes a latch and linkage assembly 144 for maintaining the plug 58 in the closed position and for providing an indication to an observer at the manway 42 of whether the plug 58 is or is not in the closed position.

As seen in FIGS. 4 and 5, the latch and linkage assembly 144 includes a latch 146 having two generally L-shaped legs 148 interconnected by a bracket 150. Each leg 148 includes a linear member 152 and an arcuate member 154. The upper end of each linear member 152 is pivotally mounted to an associated arm 141 of the U-shaped bracket 140 by a rivet 155 or the like, so that the legs 148 straddle the plug stem 76.

The latch and linkage assembly 144 also includes a linkage assembly 156 which, as seen in FIGS. 3, 5, 9 and 10, includes an elongated latch rod 158 having an L-shaped handle 159 positioned near the top of the manway 42 (FIG. 9). The latch rod 158 extends through a guide loop 165 on manway 42 (FIG. 9). The lower end of the rod 158 is connected by welding, or the like, to a tubular connecting member 162 (FIGS. 7 and 12) which receives a bolt 164 which extends through apertures in the arcuate members 154 of both legs 148 for connection to the latch 146.

The latch 146 has latched and unlatched positions. As seen in FIGS. 5 and 11, when the axes of linear members 152 of the latch 146 are substantially parallel to the axis of the plug stem 76, the latch 146 is in the latched position and the plug 58 cannot be moved out of its closed position. To place the latch 146 in the unlatched position, an operator at the manway 42 must pull the L-shaped handle 159 in an upward direction away from the plug 58. The latch 146 coupled to L-shaped handle 159 is then pivoted about the rivets 155 to a position away from the plug 58, shown in FIG. 12, thereby allowing the operating mechanism 74 to move the plug 58 from its closed position.

The operating mechanism 74 and latch and linkage assembly 144 cooperate to open and close the primary valve 54. When the latch 146 is in its latched position (FIGS. 5 and 11), the C-shaped lever 112 is in its locked condition (FIG. 8), and the plug 58 is in its closed position. The springs 94 bias the lower tube 80 away from the upper tube 88, causing the plug 58 to be biased against the flange 60 to effectuate the liquid-tight seal therebetween. To insure proper seating of the plug 58, the springs 94 exert a force typically exceeding 400 pounds, typically a force of between 400 and 600 pounds, on the plug 58. When the catch 124 has been rotated, as in FIG. 10, to allow the C-shaped lever 112 to be moved out of recess 119 to the approximate position shown in FIG. 9, the springs 94 extend causing the intermediate tube 82 to be further biased out of the lower end 89 of upper tube 88 thereby lengthening the variable length portion 91 of the linkage structure 78. At this point, the variable length portion 91 has reached its maximum length wherein the bottom of the slots 90 of the upper tube 88, as seen in FIG. 14, contact bolt 96. (As discussed further below, FIGS. 13–15 illustrate the different lengths the variable length portion 91 can have due to the varying amount of compression of the springs 94.)

The lengthening of the variable length portion 91 causes the tubular rod 98 and the L-shaped link 104 to be moved up toward the top of the manway 42 and the L-shaped link 104 to pivot about bolt 110, which causes the lever 112 to be automatically rotated out of the recess 119 to the position shown in FIG. 9.

At this point (or prior to the release of the C-shaped lever 112 from its locked condition), the L-shaped handle 159 must be pulled and held up, as discussed above, to remove the latch 146 from its latched position to allow the plug 58 to be moved from the outlet opening 64 of the flange and open the valve 54. The lever 112, then can be moved from the position shown in FIG. 9 to that shown in FIG. 10. This movement of the lever 112 causes the L-shaped link 104 to be pivoted about bolt 110 causing the coupled bracket 100, tubular rod 98, and upper tube 88 to move upwards away from the plug 58, the coupled intermediate tube 82, the lower tube 80, the plug stem 76 to also move up thereby causing the plug 58 to be moved from its closed position to allow flow through the outlet opening 64.

The plug 58 is moved back to its closed position by rotating the C-shaped lever 112 clockwise to the position shown in FIG. 9. The C-shaped lever 112 is further rotated and pressed down until it is placed back in recess 119. During this movement, the C-shaped lever 112 will contact the projection 128 of the catch 124 and rotate it in the direction of arrow B of FIG. 9. After the C-shaped lever 112 clears the projection 128, gravity will cause the catch 124 to automatically and quickly rotate back counterclockwise so that the arcuate recess 130 is directly above the C-shaped lever 112, thereby placing the C-shaped lever 112 in its locked condition and trapping the C-shaped lever 112 in recess 119.

When the plug 58 is in its closed position and the L-shaped handle 159 is not manually held up, as seen in FIG. 9, the L-shaped handle 159 has a lowermost or first position within the manway 42. When the plug 58 is not in the closed position as shown in FIG. 12, the handle 159 has a second position preferably above the manway 42, such as, for example, that shown in FIG. 10, so as to clearly indicate that the valve is not closed.

Figure 12:
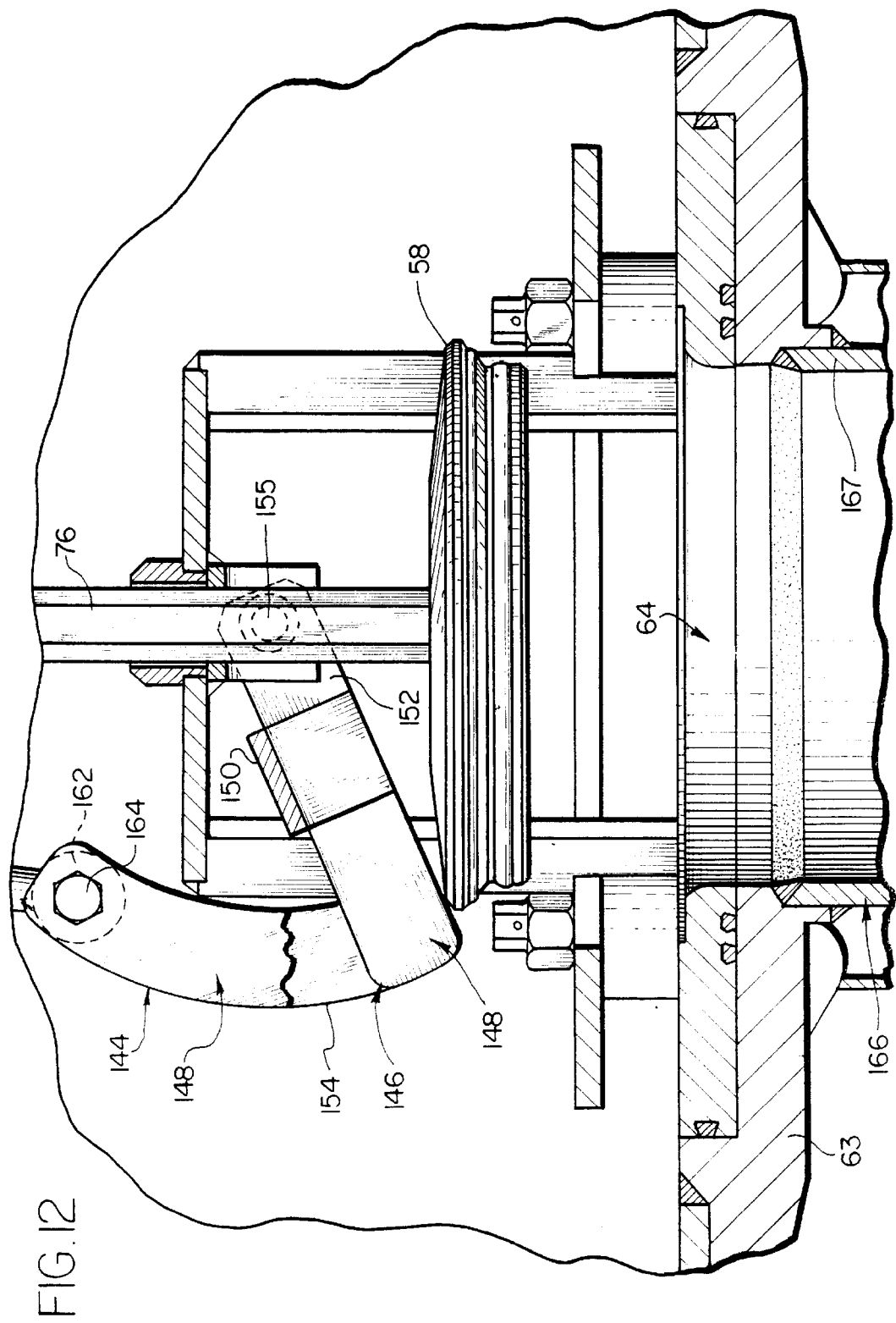
FIG. 12 is a view similar to FIG. 11 illustrating the poppet in the open condition.

When the plug 58 is being moved from its open position to its closed position, the latch 146, as seen in FIG. 12, rests on the plug 58. As the plug 58 is moved toward its closed position, the latch 146 rotates about rivets 155, causing the latch rod 158 and L-shaped handle 159 to move down relative to the manway 42 until the plug 58 is pressed into its closed position. If the plug 58 is properly seated in its closed position, latch 146 will swing, by gravity, to the position shown in FIG. 11, wherein the axes of the linear member 152 of the latch 146 are substantially parallel to the axis of the plug stem 76 and the L-shaped handle 159 is in the position shown in FIGS. 8 and 9.

If the plug, however, is not properly seated and is not in its closed position, the axes of the linear member 152 of the latch 146 will not be able to move to the FIG. 11 position. Thus, the L-shaped handle 159 will remain up and not return to its lowermost position shown in FIGS. 8 and 9. This allows an observer, at the manway 42 to know, when the L-shaped handle 159 is not in the position shown in FIGS. 8 and 9, that the plug 58 is not in its closed position, thereby alerting the observer that a liquid-tight seal between the plug 58 and the outlet opening 64 has not been achieved and a potentially dangerous situation may exist. Preferably the L-shaped handle 159 will extend above the top of the manway 42 when the plug 58 is unseated, so that the manway cover 48 cannot be securely closed.

As discussed above, the linkage structure 78 includes a variable length portion 91. The dimensions of the tank car 40 can change due to temperature, product loads, pressure, flexure during transportation, or other factors. Because the variable length portion 91 can be elongated and compressed, the variable length portion 91 allows the plug 58 to remain in its closed position when the diameter (or height) of the tank car 40 changes, without breaking or damaging any portions of the operating mechanism 74. It is typical that the diameter of the tank car 40 can vary up to about plus or minus one inch, or up to about two inches total. The slots 90 preferably must have a length greater than the combined elongation and compression of the height of the tank car 40. The slots 90, for typical elongation and compression would, therefore, preferably have a length greater than two inches.

FIGS. 13–15 illustrate the variable length portion 91 after the diameter of the tank car 40 has been elongated and compressed by various amounts.

As seen in FIGS. 2, 3, and 12 the secondary closure 56 is welded or otherwise coupled to the saddle 63. The cylindrical wall 46 includes a tubular nozzle 166 disposed below outlet opening 64 and projecting from the bottom portion 52 of the tank car 40. The nozzle 166 is formed by a circular sidewall 167, and, as seen in FIG. 20, has a terminal end 168 which defines a circular opening 170 and a circular seat 172. The nozzle 166 also has an annular, radially outwardly extending projection 174 disposed at the terminal end 168. The annular projection 174 includes an annular portion 175 spaced from the sidewall 167 and forming a groove 176 therebetween, the groove 176 and the annular portion 175 defining a keeper. The secondary closure 56 also includes a circular outlet cap 178, which includes a thicker central portion 180 and a thinner peripheral portion 182. An annular groove 184 is formed between the central portion 180 and the peripheral portion 182. A seal 186 is disposed in the annular groove 184.

Figure 30:
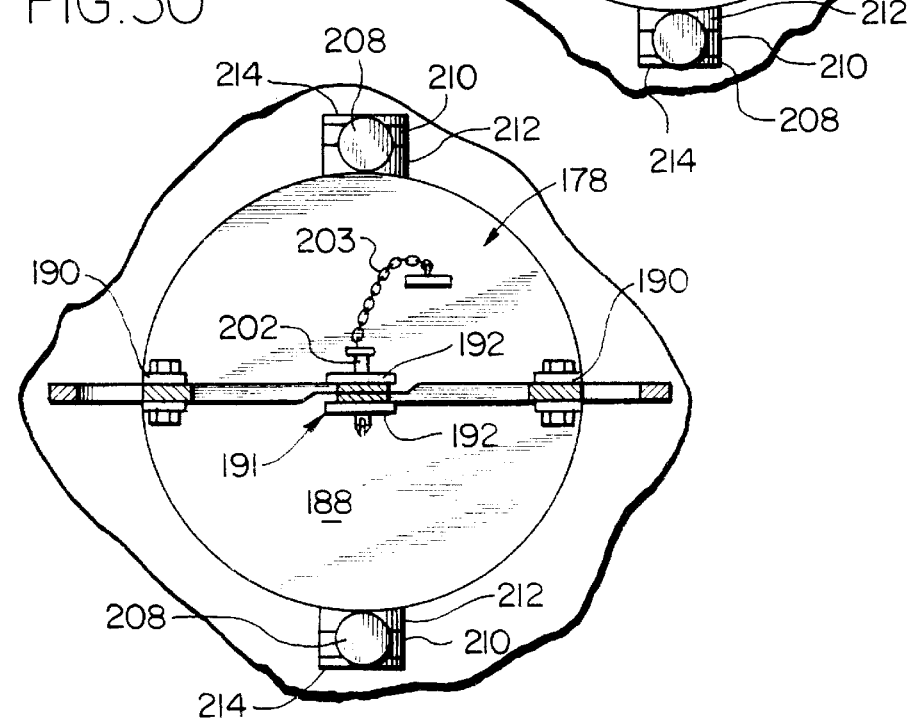
FIG. 30 is a sectional view taken generally along line 30—30 of FIG. 20.

As seen in FIGS. 20 and 30, the outlet cap 178 has a bottom 188. Connected to and depending from the bottom 188 are two diametrically opposed U-shaped brackets 190 and a central U-shaped bracket 191 having a pair legs 192, each having an aperture 193 (FIG. 17).

Figure 29:
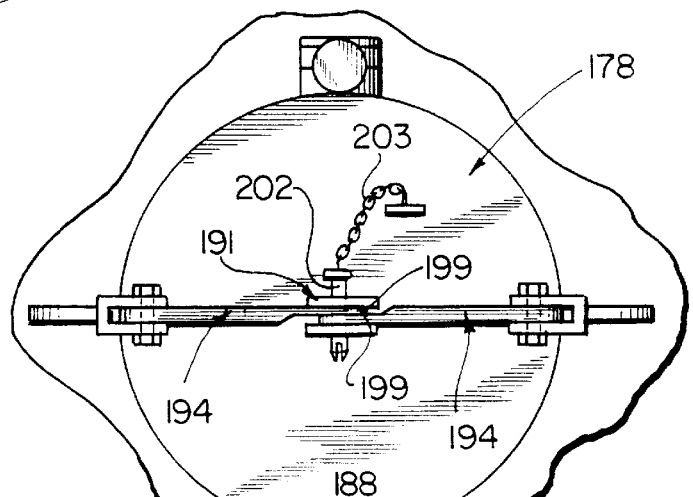
FIG. 29 is a sectional view taken generally along line 29—29 of FIG. 20.
Figure 18:
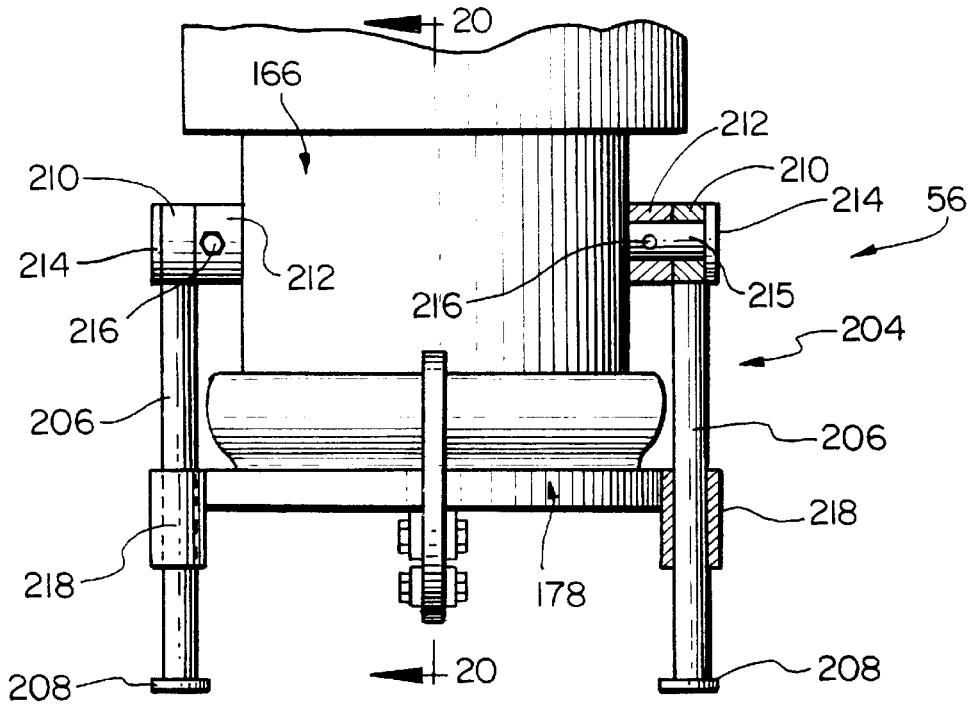
FIG. 18 is an end elevation view, in partial section, illustrating the secondary valve of FIG. 16 in a closed position.
Figure 19:
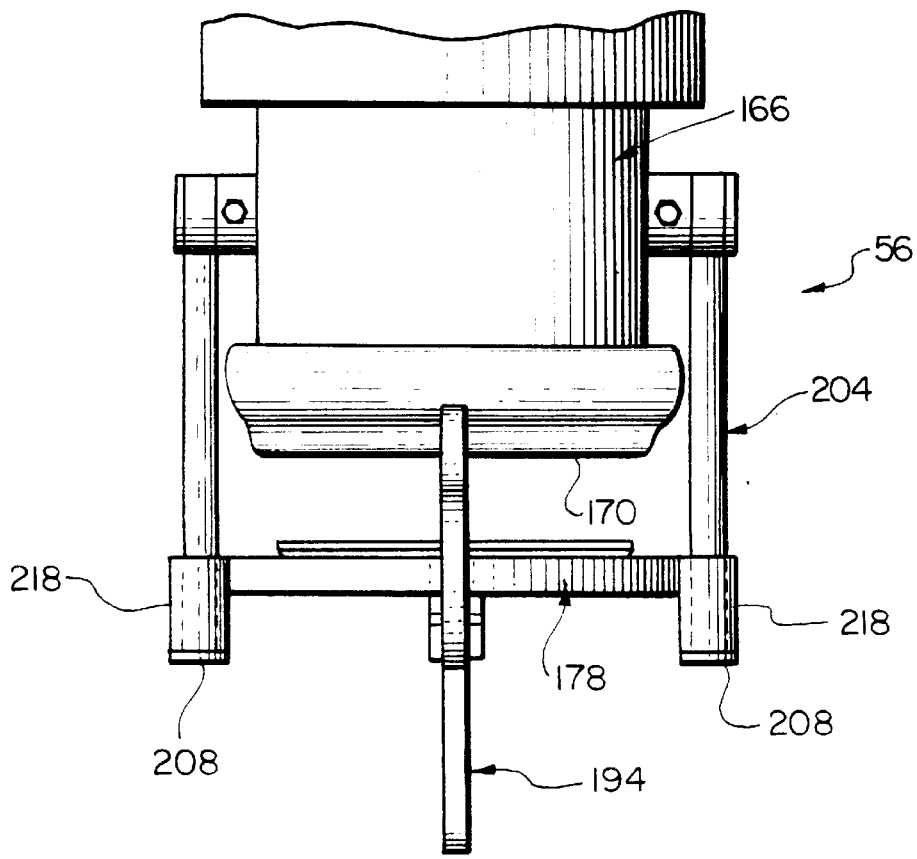
FIG. 19 is a view similar to FIG. 18, illustrating the secondary valve in an open position.
Figure 27:
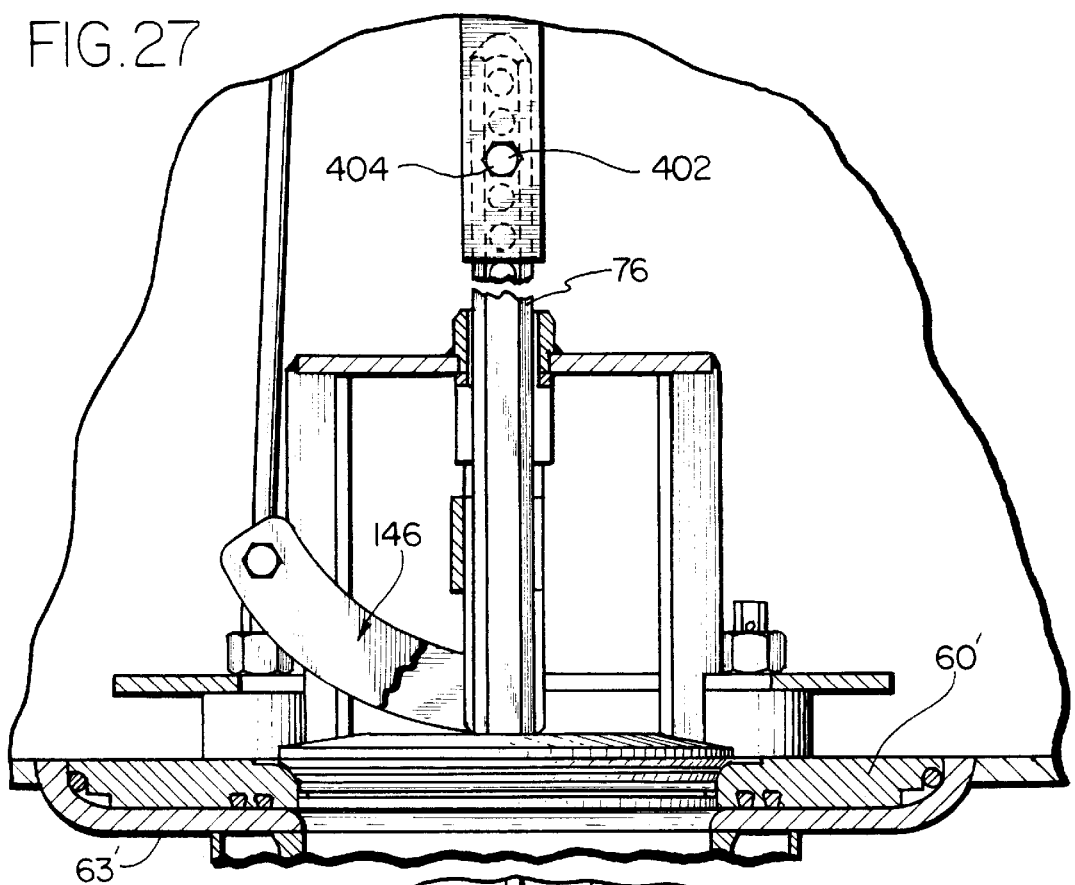
FIGS. 27 and 28 are, respectively, enlarged views of lower portion of the operating mechanisms of FIGS. 22 and 21.
Figure 28:
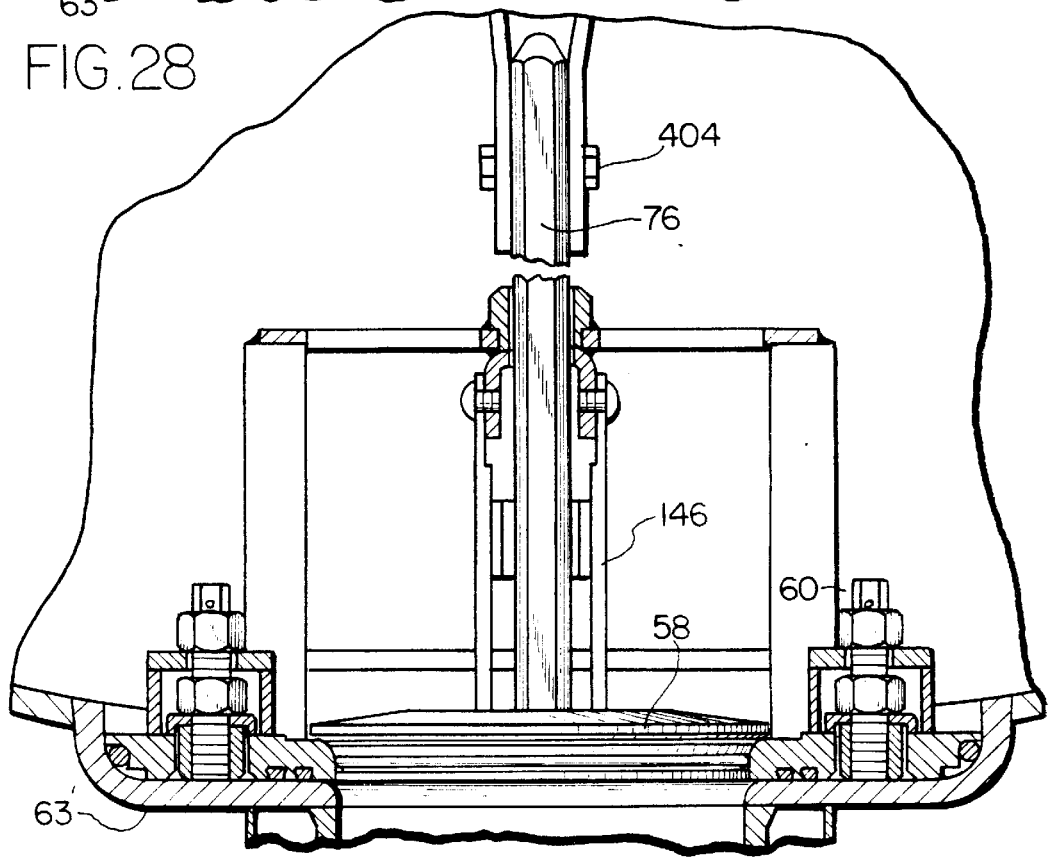

As seen in FIGS. 16–20, two handles 194 are pivotally coupled to the outlet cap 178. Each handle 194 includes a generally rectangular hand portion 196. Hand portions 196 may also have other shapes, such as an L-shaped lever. Each hand portion 196 is pivotally coupled by a bolt 198A to an associated U-shaped bracket 190. Each handle 194 includes a hook-engaging portion 197 pivotally coupled to the hand portion 196 by a bolt 198B which also acts as a fulcrum for hand portion 196. Each hand portion 196 also includes a thinned end 199 (FIG. 29) having an aperture 200 (FIG. 20). Each hook-engaging portion 197 includes an engaging end 201. As discussed further below, the outlet cap 178 is moveable between open and closed positions. In the closed position, as illustrated in FIGS. 16, 18, and 20, the handles 194 force the seal 186 of the outlet cap 178 against the seat 172 of the nozzle 166 to form a liquid-tight seal therebetween. In the open position, as shown in FIGS. 17 and 19, the seal 186 is disposed away from seat 172 and a liquid-tight seal is not effectuated, whereby liquid can flow out of the valve opening 170.

The handles 194 are each moveable between locked and unlocked conditions. In the locked condition, hand portions 196 are pivoted so that locking apertures 200 are each aligned with aperture 193 of the U-shaped bracket 191. (When the locking aperture 200 and aperture 193 are not aligned, the handles 194 are in their unlocked condition.) A stop pin 202, similar to pin 130 shown in FIGS. 6A and 6B, is placed through aligned locking aperture 200 and aperture 193 to maintain the handles 194 in the locked condition. To prevent its loss and to provide easy access, the stop pin 202 may be permanently affixed to the outlet cap 178 by a chain 203 coupled, such as by welding, to both the outlet cap 178 and the stop pin 202. As seen in FIG. 20, when the engaging ends 201 of the hook engaging portions 197 are disposed in groove 176, and the handles 194 are in their locked conditions, the outlet cap 178 is placed in its closed position.

To remove the outlet cap 178 from its closed position, hand portions 196 are respectively pivoted about bolts 198 in the direction of arrows E and F in FIG. 20. This pivoting combined with lifting causes the engaging end 201 of each hook engaging portion 197 to be raised out of the groove 176 and laterally moved away therefrom as indicated in broken line in FIG. 20, allowing the outlet cap 178 to be free to be lowered down from its closed position.

The outlet cap 178 is advantageously coupled to the sidewall 167 of the nozzle by a slide assembly 204, which includes two rods 206. As best seen in FIG. 18, each rod 206 includes an annular stop projection 208 at one end and a tubular connection 210 at its other end.

The slide assembly 204 is pivotally coupled to the nozzle 166. As seen in FIG. 18, the nozzle 166 has two diametrically opposed tubular projections 212. Two pins 214, each having a shaft 215, are respectively disposed through the tubular connections 210 and associated tubular projections 212. Each shaft 215 has an aperture and is locked in place by a bolt 216 passing through the aperture and an associated tubular projection 212. The rods 206 are thus each pivoted about an associated shaft 215.

As seen in FIG. 18, the outlet cap 178 has two diametrically opposed tubular members 218. Each tubular member 218 coaxially slidably receives one of the rods 206, thereby slidably coupling the outlet cap 178 to the slide assembly 204.

As seen in FIGS. 16–19, when the handles 194 are moved from their locked conditions, as shown by the dashed lines of FIG. 20, the outlet cap 178 will slide down the rods 206 until the tubular members 218 contact the stop projections 208, as seen in FIGS. 17 and 19, thereby moving from its closed position to an open position.

As seen in FIG. 17, when the outlet cap 178 is in this open position, the rods 206 and the outlet cap 178 coupled thereto can be pivoted about shafts 215 from beneath the nozzle 166, so that no portion of the outlet cap 178 or handles 194 lie below valve opening 170 or imaginary cylindrical extensions thereof, thereby allowing a hose connection to be made to annular projections 174 and 175, or allowing unimpeded liquid flow out of the valve opening 170 if no hose connection is made.

As seen in FIG. 17, the outlet cap 178 and handle 194 may be maintained in this out-of-the-way position by a hook and chain arrangement 230. This arrangement includes a hook 232 at on end of a chain 234 coupled to the lower hand portion 194 and the other end of the chain 234 permanently coupled to the sidewall 41 of the tank car 40 (FIG. 3).

FIGS. 21–28 illustrate an alternative bottom outlet valve assembly 50' which is substantially identical to the bottom outlet valve assembly illustrated in FIGS. 1–20, except that it includes a different linking structure 78' and a different flange 60' and saddle 63'. As seen in FIG. 21, the linkage structure 78' includes two elongated, bow-shaped tie rods 400, each coupled at one end to the plug stem 76 (FIG. 27) by a fastener 402 disposed through an aperture in the plug stem 76 and apertures in each of the tie rods 400. The tie rods 400 are each coupled at the other end to a respective bracket 404, as shown in FIG. 26, having a plurality of adjustment holes 406. To couple a bracket 404 to a tie rod 400, two fasteners 408 are disposed through respective apertures in the tie rods 400 and associated holes 406 in a respective bracket 404 (FIG. 26).

Each of the brackets 404 is coupled at its topmost end to bolt 108, which is disposed through the L-shaped link 104 as described above with respect to the first embodiment. The plug 58 is moved between its open and closed position in the same manner as described in the first embodiment.

These bow-shaped tie rods 400 are selected of width and thickness to provide a nearly constant spring preload force of 400 to 500 lbs. on the plug 58 at plus or minus 1" tank diameter change.

As shown in FIGS. 23 and 24, like the variable length portion 91 of the first embodiment, the bowed tie rods 400 can vary in length along the axis of the plug stem 76. When, as seen in FIG. 23, the height of the tie rods 400 is compressed, the tie rods 400 become more bowed. When as seen in FIG. 24, the height of the tie rods 400 increases, the tie rods 400 are elongated along the axis of the plug stem 76 and bow to a lesser degree.

FIGS. 31–41 illustrate a third bottom outlet valve assembly 50" very similar to the second bottom outlet valve assembly 50' except for several modifications.

Figure 40:
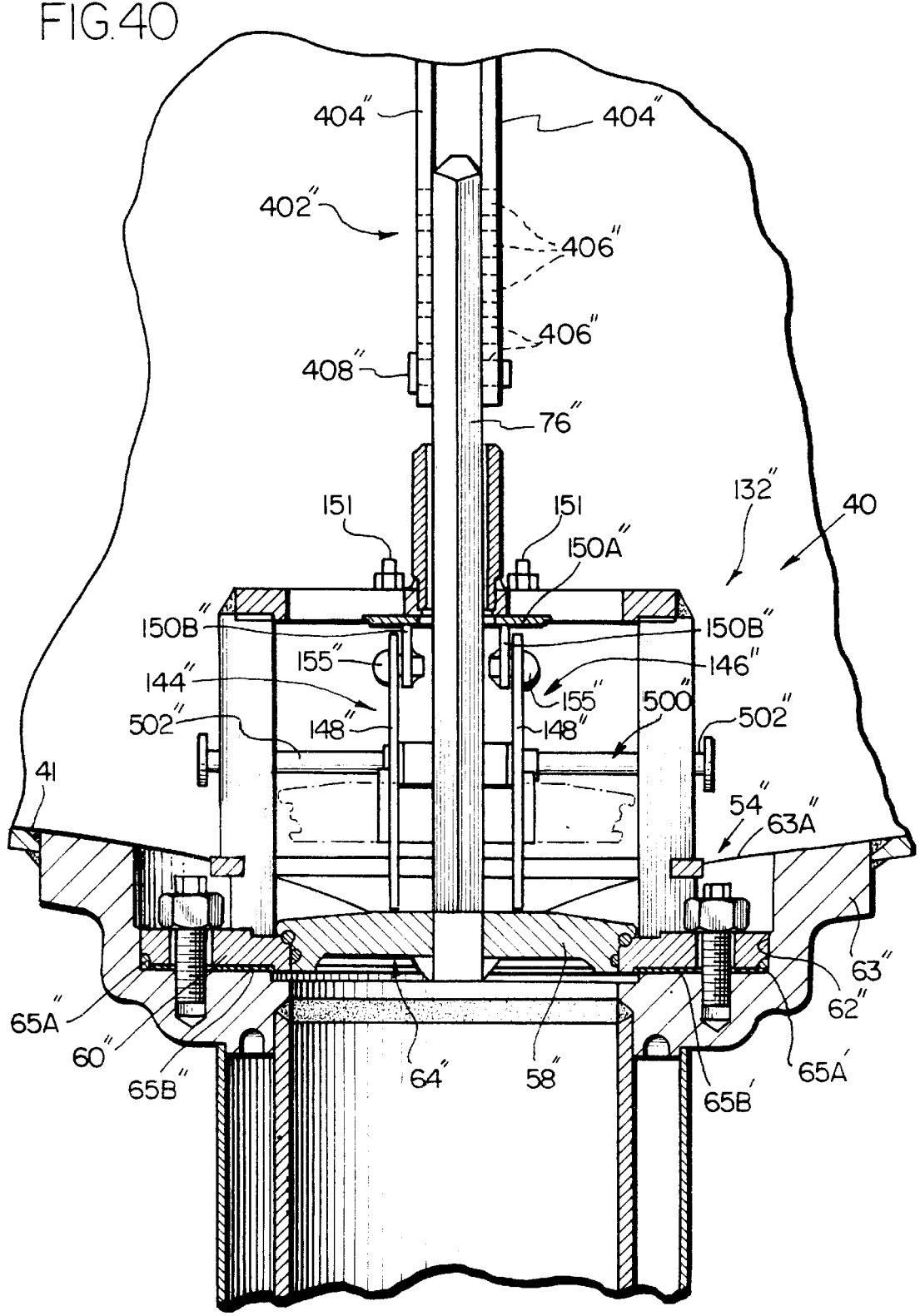
FIG. 40 is an enlarged, fragmentary, sectional view of a portion of FIG. 39.

The bottom outlet valve assembly 50" includes a primary valve 54" disposed essentially within the sidewall 41 of the tank car 40 and a secondary valve or closure 56" disposed essentially outside the sidewall 41. As best seen in FIG. 40, the primary valve 54" includes a substantially circular plug 58", and a flange 60" disposed in a recess 62" in a saddle 63" fixed to the sidewall 41. The flange 60" cooperates with the saddle 63" to define circular outlet opening 64". An o-ring 65A" sits in the outer peripheral corner of recess 62" and a circular gasket 65B" is disposed between the flange 60" and saddle 63" to effectuate a liquid tight seal between the flange 60" and saddle 63". As discussed below, the flange 60" is coupled to the saddle 63" by bolts in a known manner. The saddle 63" is an insert saddle and is designed to provide reinforcement for the opening 64a in sidewall 41 per AAR standards. The saddle 63" is welded to the tank sidewall along its outer periphery and no portion of the sidewall 41 sits atop the saddle 63", unlike saddle 63 (FIG. 5), where the sidewall 41 sits atop a portion of saddle 63. The saddle 63" is deeper than saddle 63 and is shaped to conform to the curvature of sidewall 41 of the tank car 40. The sidewall 41 has a surface 63A" (FIG. 40) curving vertically downward from the periphery to the center of the saddle 63" and forming a trough 65 which aids in draining the liquid contents out of the tank car 40. Flange 60" defines a valve seat for the plug 58" to seat with and form a liquid-tight seal therebetween in the same manner as the first two assemblies 50, 50'.

Figure 31:
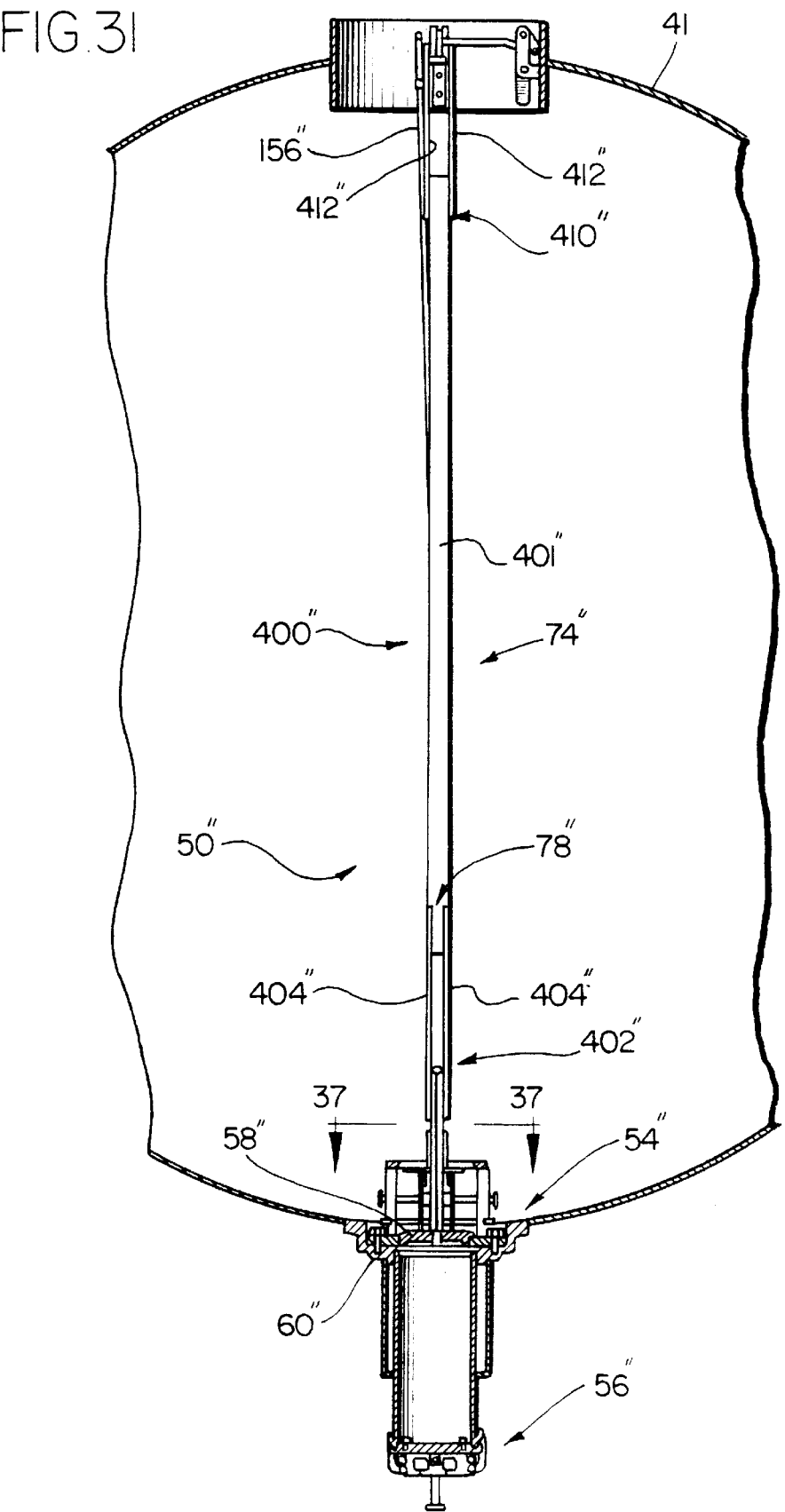
FIG. 31 is a sectional view similar to FIG. 3 of a third embodiment.
Figure 32:
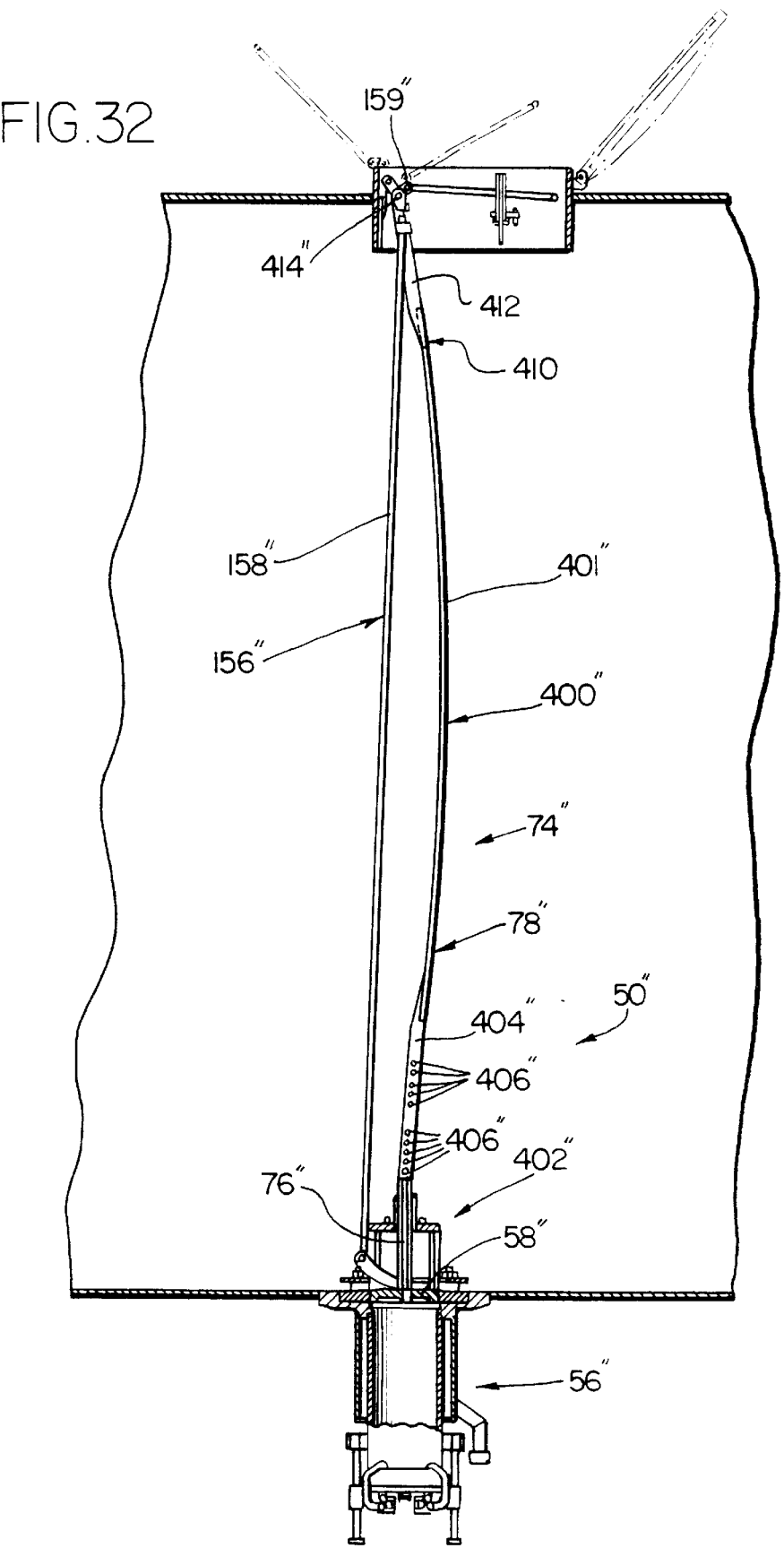
FIG. 32 is a sectional view similar to FIG. 2 of the embodiment of FIG. 31.

Referring to FIGS. 31 and 32, the valve assembly 50" includes an operating mechanism 74" for opening and closing the primary valve 54". (i.e., moving the plug 58" between its open and closed positions). Referring to FIG. 40, the operating mechanism 74" includes a plug stem 76" connected to the center of the plug 58".

Figure 34:
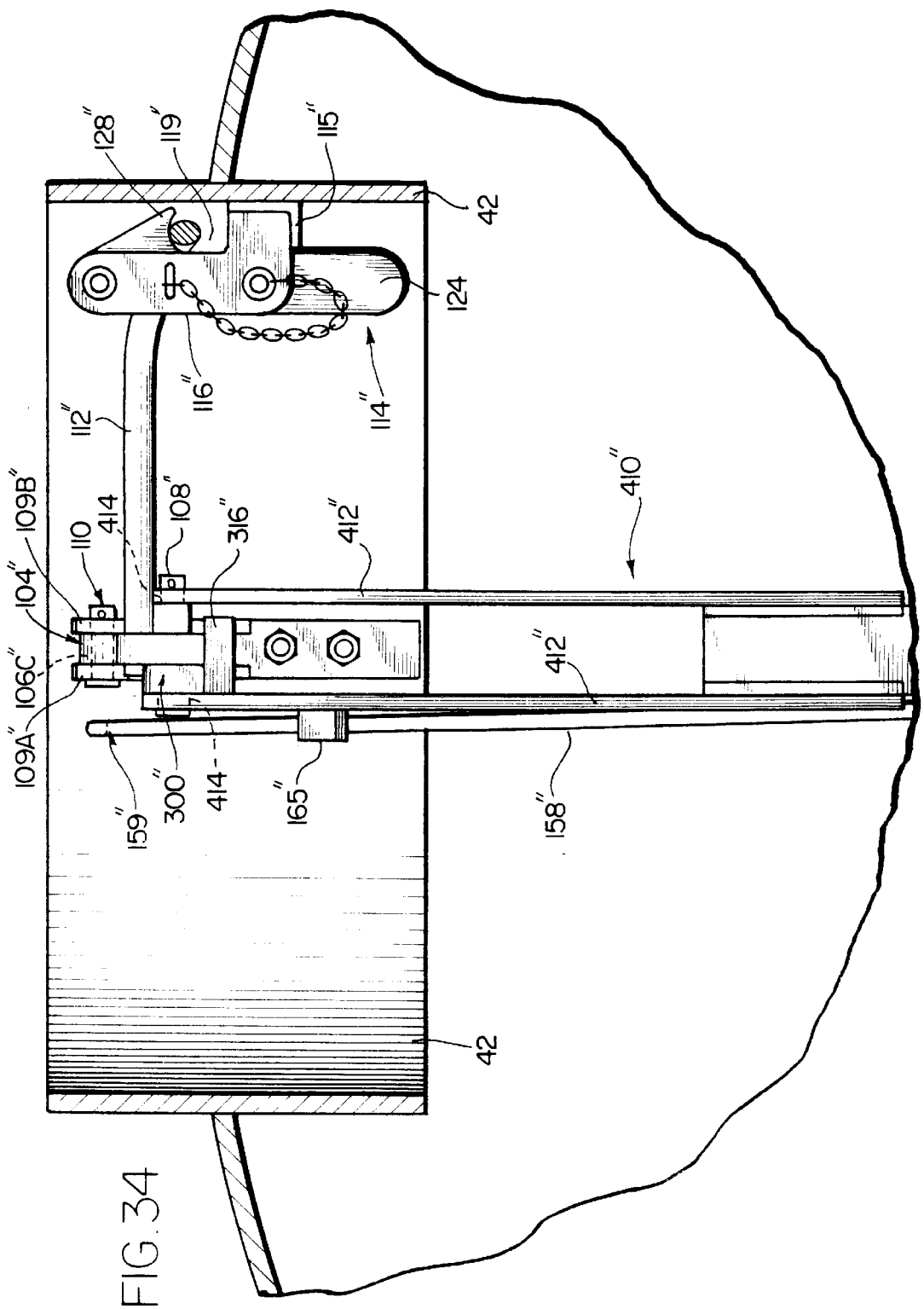
FIG. 34 is a fragmentary, sectional view taken generally along line 34—34 of FIG. 33.

As seen in FIGS. 31–32, an operating mechanism 74" includes a linkage structure 78" coupled to the plug stem 76". The linkage structure 78" includes an elongated bow-shaped structure 400" including a central tie rod 401", a lower end 402" having two spaced-apart bars 404" welded to the tie rod 401". Each of the bars 404" has ten length-adjustment apertures 406" disposed in upper and lower sets consisting of five apertures 406" each. The apertures 406" on one bar 404" are aligned with respective apertures 406" on the other bar 404". As seen in FIG. 40, the lower end 402" is connected by a fastener 408", such as a rod and cotter pin, disposed through an aperture in the plug stem 76" and aligned apertures 406" in each of the bars 404". (Depending on the diameter of the tank car 40, the lower set of apertures 406" may be unnecessary and the bars 404" can appropriately be cut to remove them.) Referring to FIGS. 31, 32 and 40, the bow-shaped structure 400" also includes an upper end 410" having two spaced-apart bars 412", each having an aperture 414" (FIG. 34).

Like the tie rods 400 of assembly 50, the bow-shaped structure 400" forms a variable length portion of the linkage structure 78" which can expand or contract to compensate for in-use changes in the diameter of the tank car. When the tank car 40 diameter is compressed, the tie rod 401" bows to a greater extent and when the diameter is elongated, the tie rod 401" bows to a lesser degree. The bow-shaped tie rod 401" is selected of a width and thickness to provide a nearly constant spring preload force of 400 to 500 lbs. on the plug 58" at plus or minus 1" tank diameter change, when the plug 58" and C-shaped lever 112" respectively are in closed and latched positions.

The operating mechanism 74" also includes a generally L-shaped link 104" having three apertures 106A–C" (FIG. 36A). The L-shaped link 104" has two arms 105" which form an angle of about 90° with each other. The linkage structure 78" is pivotally coupled to the L-shaped link 104" by a fastener 108" passing through associated apertures 414" of the bars 412" and the aperture 106B" of the L-shaped link 104".

Figure 33:
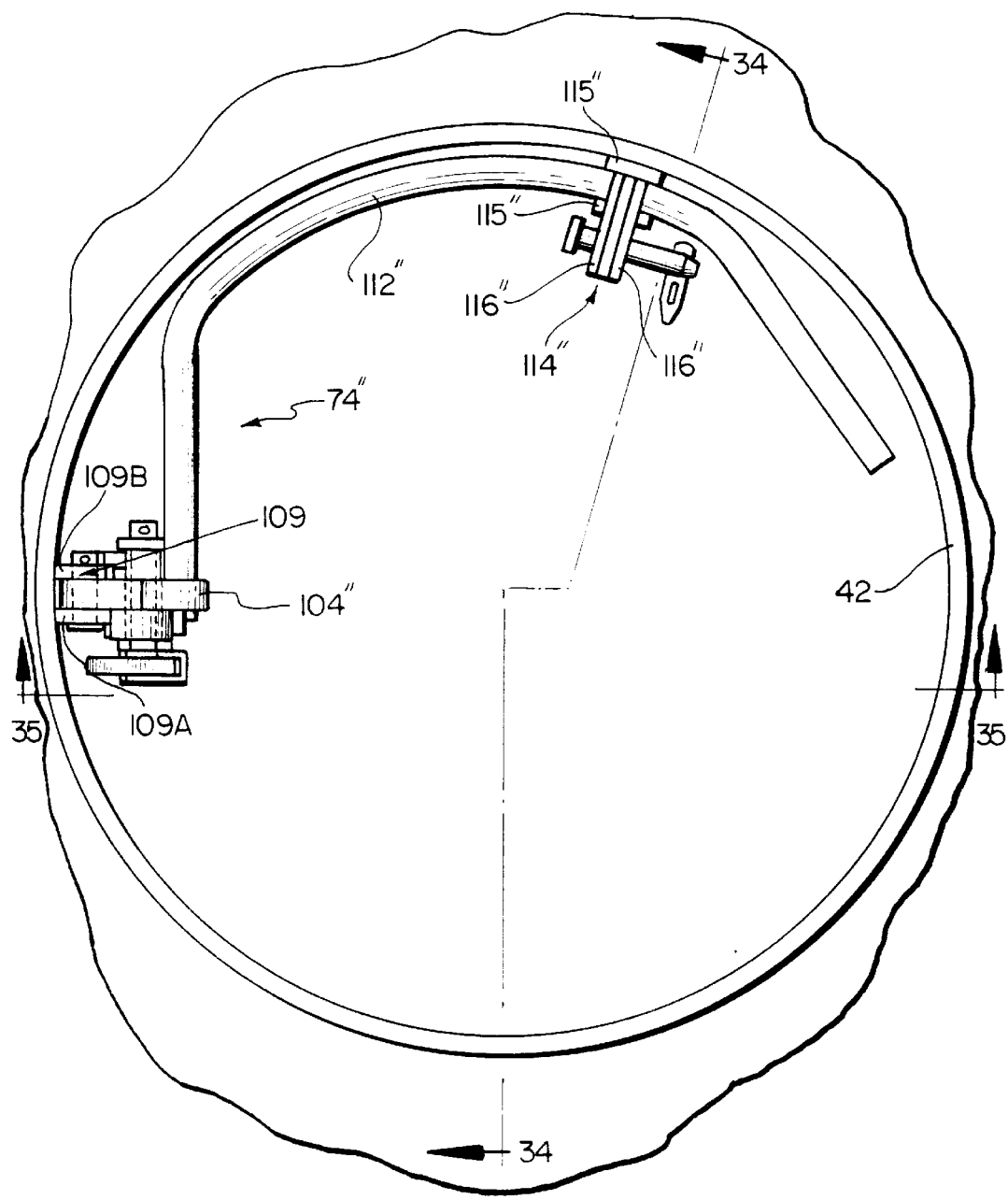
FIG. 33 is an enlarged top plan view of a portion of the operating mechanism of the third embodiment.

A bracket 109" having first and second spaced apart arms 109A", 109B" with holes aligned with each other is connected by mechanical fasteners, welding, or the like, to manway 42 (FIG. 33). As seen best in FIG. 34, the L-shaped link 104" is pivotally mounted to the manway 42 by a fastener 110" disposed through the holes of the arms 109A", 109B" of the U-shaped bracket 109" and aperture 106C" at an end of the L-shaped link 104". Each of the arms 109A", 109B" has an upper engaging surface 111" (FIG. 36B) consisting of a first surface 111A" substantially perpendicular to the wall 46 of the manway 42 and a second surface 111B" inclined toward the top of the manway 42.

As seen in FIG. 33, the operating mechanism 74" also includes a moveable, generally C-shaped lever 112" fixedly connected to an end of the L-shaped link 104" and thereby coupling the C-shaped lever 112" to the plug 58". As with the other assemblies 50, 50' described above, movement of the C-shaped lever 112" causes the plug 58" to be moved between its open and closed positions. The C-shaped lever 112" has a smaller linear extent and a different C-shape than lever 112 which allows it to lie closer to the wall of manway 42 and take up less space than the C-shaped lever 112" of the earlier described assembly 50, so as to better minimize obstruction and provide greater clearance for entry of workers and equipment.

As seen in FIGS. 33–35, a stop latch 114" is mounted to the manway 42 to trap the lever 112" and prevent it from moving in a valve-opening direction. The stop latch 114" is substantially identical to stop latch 114 of assembly 50 except that it includes an L-shaped member 115" welded to the manway 42 and to the two L-shaped legs 118" of clevis bracket 116".

The stop latch 114" functions identically as stop latch 114 to lock the lever 112" in recess 119", except that the L-shaped member 115" contacts and stops the catch 124" as it is swung back in a counterclockwise direction (as viewed in FIG. 34). This maintains a hook projection 128" of the catch 124" in the recess 119" and aids in preventing the lever 112" from moving out of the recess 119".

Referring to FIGS. 37–40, the bottom outlet valve assembly 50" also includes a guide assembly 132" substantially identical to guide assembly 132 of assembly 50. The guide assembly 132" is coupled to the saddle 63" by four nuts 134" and four studs 135". The guide assembly 132" includes an upper plate 136" having a guide 138" at its center, a contoured lower plate 139" and four bars 143" resting on flange 60" and connecting and supporting the upper and lower plates 136", 139". The plug stem 76" is disposed through the guide 138", which aids in guiding the plug 58" (coupled to the plug stem 76") to the outlet opening 64" for proper seating with respect thereto. The upper plate 136" also has four holes 145" (FIG. 37) described further below.

The bars 143" are thicker than bars 143 of guide assembly 132 and provide added strength. The lower plate 139" is contoured about the nuts 134" and studs 135" to take up less area than the circular lower plate 139 of assembly 50 to improve flow through the outlet 64".

The bottom outlet valve assembly 50" also includes a latch and linkage assembly 144", substantially identical to the latch and linkage assembly 144 of assembly 50, for maintaining the plug 58" in the closed position and for providing an indication to an observer at the manway 42" of whether the plug 58" is or is not in the closed position.

Figure 37:
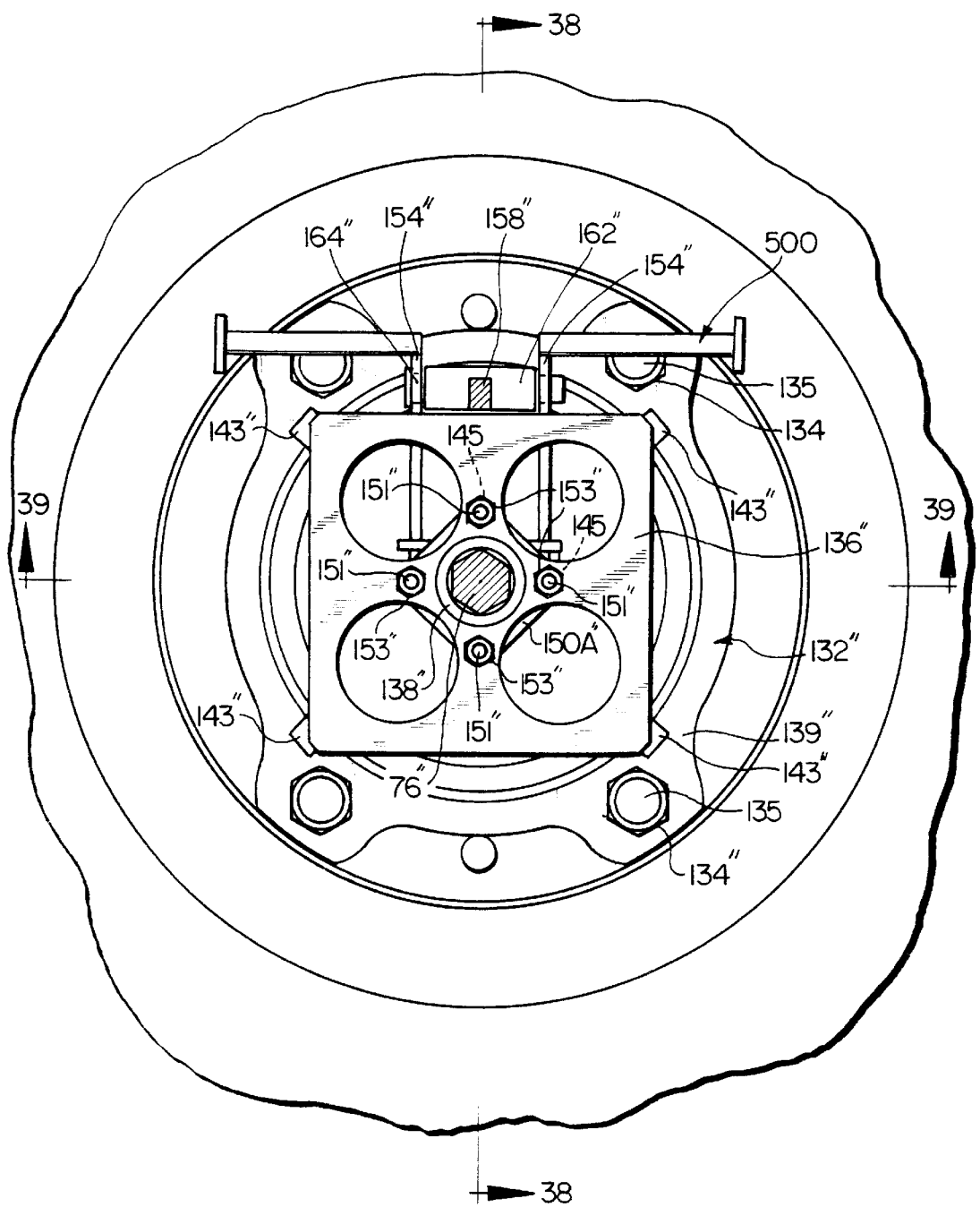
FIG. 37 is an enlarged view in horizontal section taken generally along line 37—37 of FIG. 31.
Figure 38:
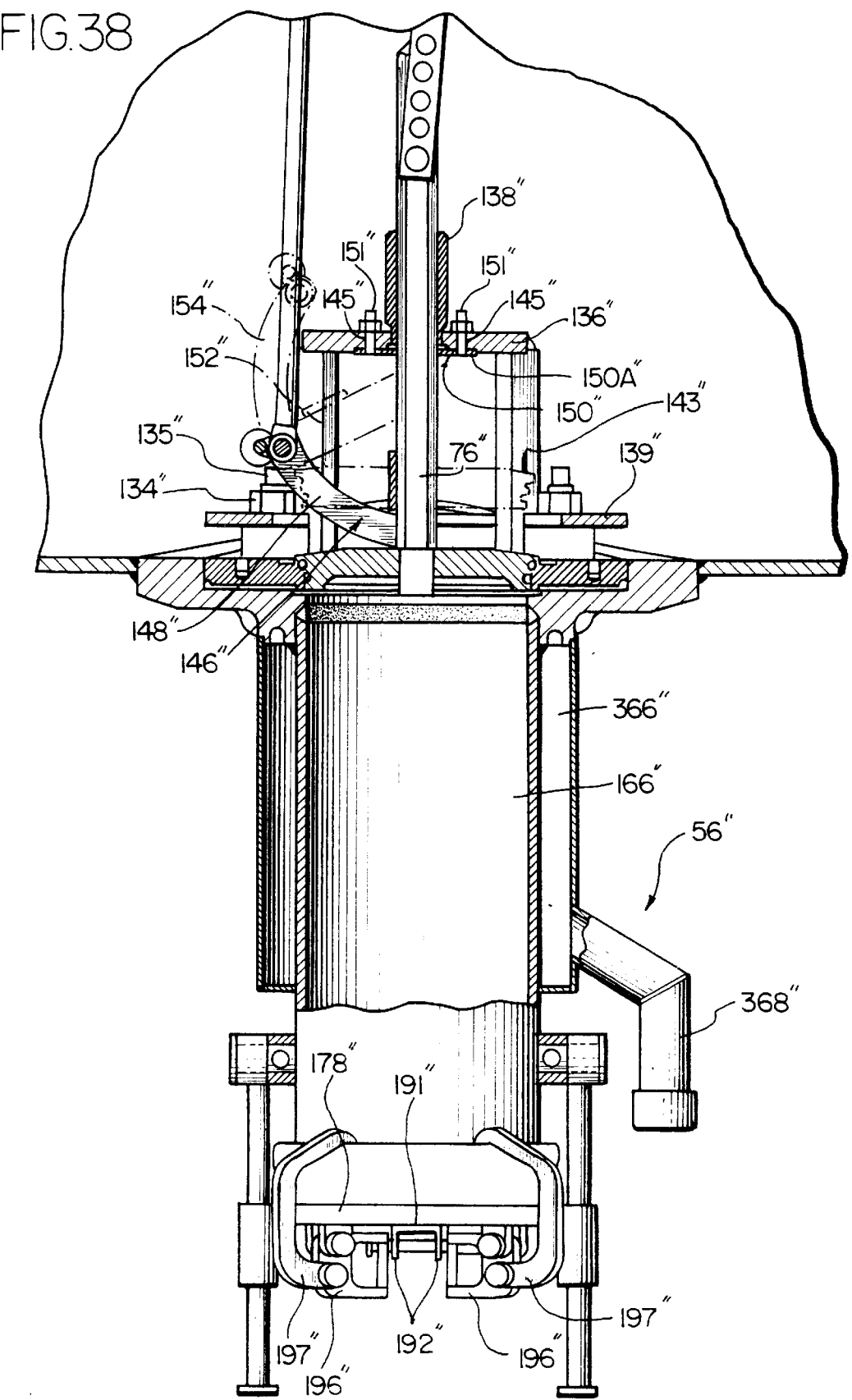
FIG. 38 is a sectional view taken generally along line 38—38 of FIG. 37.

Referring to FIGS. 37–40, the latch and linkage assembly 144" includes a latch 146" having two generally L-shaped legs 148" interconnected by a bracket 150" including a plate 150A", two arms 150B" depending from the plate 150A" (FIG. 40) and four studs 151" extending from the plate 150A" disposed through holes 145" of the upper plate 136" and fastened thereto with aid of four nuts 153" (FIG. 37). Each leg 148" includes a linear member 152" and an arcuate member 154" (FIG. 38). The upper end of each linear member 152" is pivotally mounted to an associated arm 150B" by a rivet 155" or the like, so that the legs 148" straddle the plug stem 76".

The latch and linkage assembly 144" also includes a linkage assembly 156" which, as seen in FIGS. 31 and 32, includes an elongated latch bar 158" having an L-shaped handle 159" positioned near the top of the manway 42 (FIG. 31). The latch bar 158" extends through a guide and retaining loop 165" attached to one of the bars 412" (FIG. 34). The lower end of the latch bar 158" is connected by welding, or the like, to a tubular connecting member 162" (FIG. 37) which receives a fastener 164" which extends through apertures in the arcuate members 154" of both legs 148" for connection to the latch 146".

The latch and linkage assembly 144" works substantially identically to the latch and linkage assembly 144 described above. Similarly, the operating mechanism 74" and latch and linkage assembly 144" cooperate to open and close the primary valve 54" substantially in the same manner as described above.

As seen in FIGS. 37 and 40, an auxiliary or safety linkage mechanism 500" is advantageously coupled to latch 146". The auxiliary linkage mechanism 500" includes two tubular extension 502" welded to an associated arcuate member 154" of the L-shaped legs 148". Should the latch bar 158" ever break or become damaged and prevent the latch 146" from being moved at the manway 42, an independent, elongated hooked device can be inserted through the manway 42 to hook one of the extensions 502. The hook is then pulled upward to move the latch 146" and allow the plug 58" to be opened.

The operating mechanism 74" also advantageously has a stop mechanism 300" to maintain the C-shaped lever 112" in an open position, position C, as shown in dotted line in FIG. 35, to prevent the plug 58" from inadvertently moving to its closed position. Referring to FIG. 36C, the stop mechanism 300" includes an upper end 302" having an arcuate upper surface 304" and a hole 306" therethrough. The stop mechanism 300" also has a lower end 308" which has a stop engaging surface 310" having first and second planar surfaces 312", 314", inclined with respect to one another. The stop mechanism 300" also has a grip bar 316" connected to its lower end 308".

The fastener 108" is disposed through hole 306" to pivotally couple the stop mechanism 300" to the L-shaped link 104". When the C-shaped lever 112" is in a latched or locked position, as in FIGS. 34, 35 and 36A, the stop mechanism 300" simply drops down and has a portion below the L-shaped link 104" (FIG. 35). When the C-shaped lever 112" is unlatched and rotated counterclockwise, as seen in dotted line in FIG. 35, the link 104" and stop mechanism 300" are raised above the manway 42 until the first and second planar surface systems 312", 314" of the stop mechanism 300" disposed above the upper engaging surface 111". As the lever 112" moves to the position C", the surface portions 312" and 314" rest on and are engaged, respectively, with the first and second engaging surfaces 111A", 111B" of bracket 109" (FIG. 36C). In this condition, the C-shaped link 112" is locked and cannot be rotated in a valve-closing direction. To unlock the C-shaped link 112" from this locked condition, the lever 112" is rotated, as seen in FIG. 36B further counterclockwise to provide necessary clearance so that a user may grasp the grip bar 316" and rotate the stop mechanism 300" counterclockwise in the direction of arrow E to disengage the stop engaging surface 310" of the stop mechanism 300" from the upper engaging surface 111" of the bracket 109". While a user holds the grip bar 316" and stop mechanism 300" away from the bracket 109", the C-shaped link 112" can be rotated in a valve closing direction.

As seen in FIG. 38, the tubular nozzle 166" of the secondary closure 56" may be surrounded by a steam jacket 366" coupled a steam inlet tube 368" for coupling to a steam source. The steam jacket 366" can provide added heat as necessary.

Figure 39:
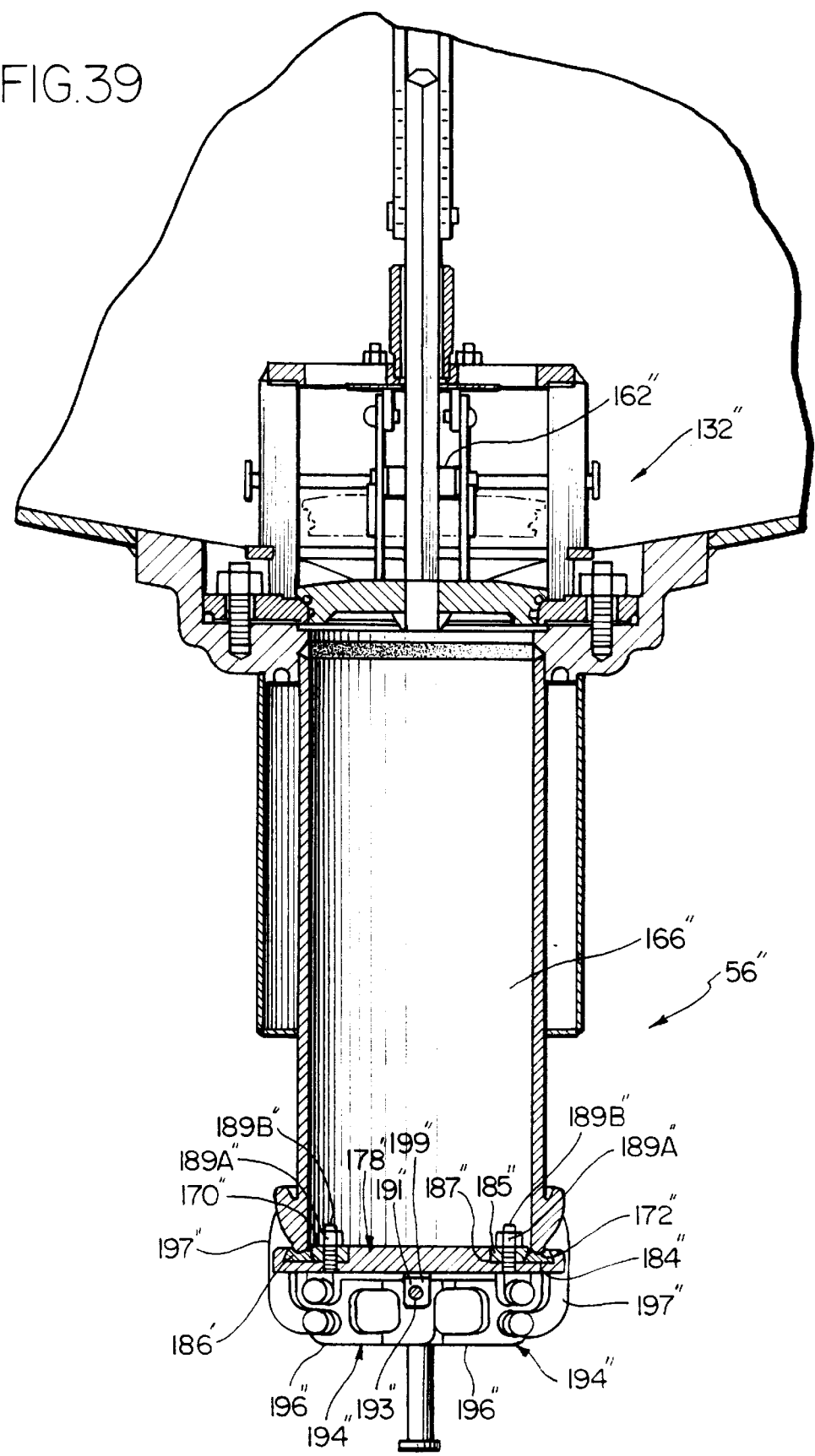
FIG. 39 is a sectional view taken generally along line 39—39 of FIG. 37.

As seen in FIG. 39, the secondary closure 56" also includes a slightly different outlet cap 178" than the outlet cap 178 of assembly 50. The outlet cap 178" includes an annular plate 185" disposed in an annular groove 187" next to a groove 184". The annular plate 185" is releasably coupled to the outlet cap 178" by a plurality of nuts and bolts 189A", 189B". The annular plate 185" retains seal 186" in place and allows easy access to the seal 186" (for replacement) when it is removed from the outlet cap 178".

Figure 41:
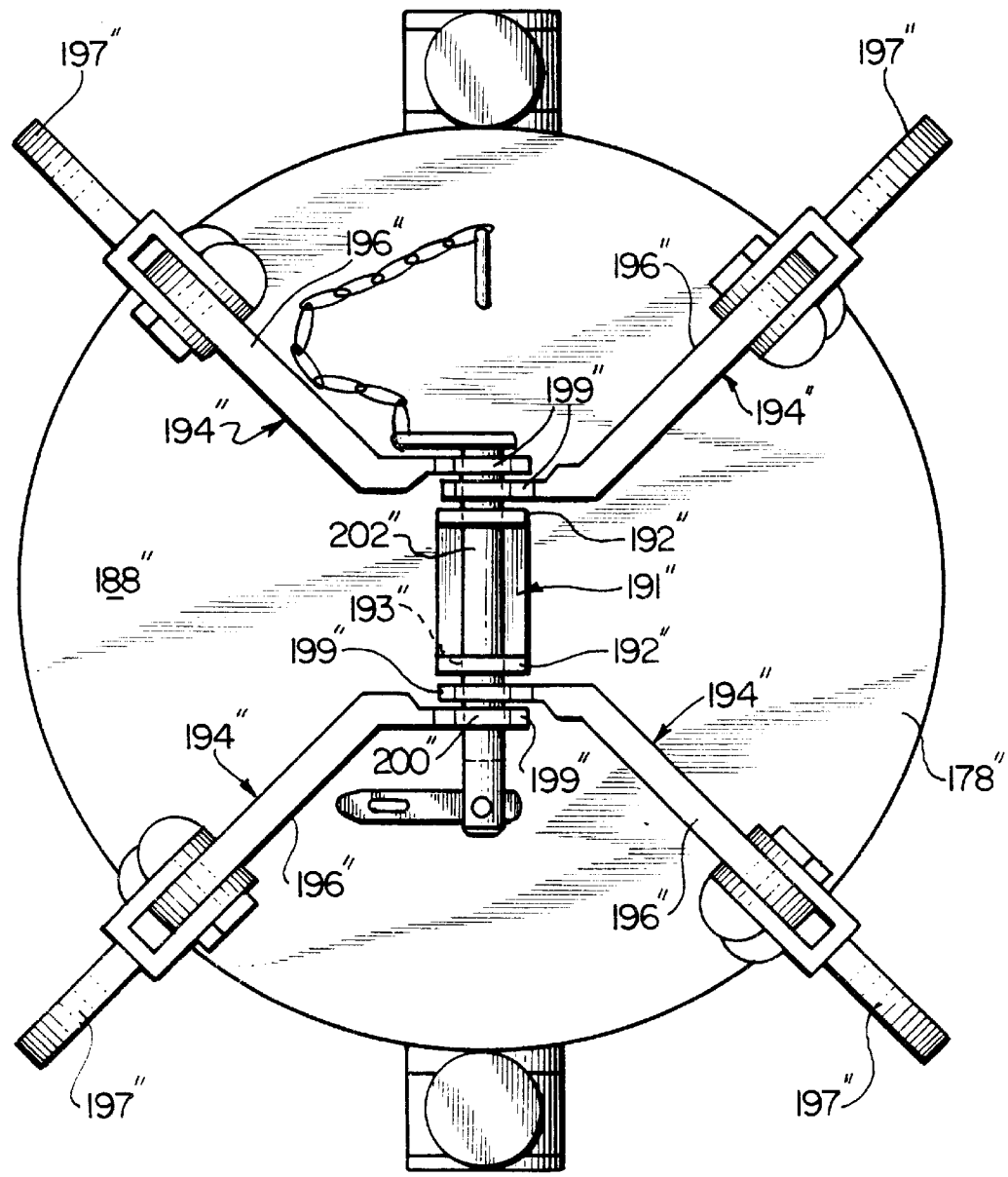
FIG. 41 is an enlarged bottom plan view of the secondary valve of the third embodiment.

Referring to FIGS. 38, 39 and 41, the secondary closure 56" also has four handles 194" pivotally coupled to the outlet cap 178" rather than two handles 194 as in assembly 50. Each handle 194" includes a generally rectangular hand portion 196" spaced about 90 degrees away from adjacent hand portions 196". Each handle 194" also includes a hook-engaging portion 197" spaced 90 degrees away from adjacent hook-engaging portions 197". Each handle 194" also includes a thinned end portion 199" (FIG. 41), inclined with respect to an associated hand portion 196" and connected to the hand portion 196". Each end portion 199" has an aperture 200". The handle 194" operates in the same manner as handles 194 to force the seal 186" against seat 172" to form a liquid-tight seal therebetween. Since there are four handles 194", rather than two, the outlet cap 178" can resist more fluid pressure through nozzle 166" to prevent leakage out of the circular opening 170".

As seen in FIG. 41, the outlet cap 178" has a bottom 188". Connected to and depending from the bottom 188" is a central U-shaped bracket 191" having a pair of legs 192", each having an aperture 193". The legs 192" are spaced apart further than legs 192 of U-shaped bracket 191.

The handles 194" are each moveable between locked and unlocked conditions. In the locked condition, handle portions 196" are pivoted so that locking apertures 200" of thinned portions 199" are each aligned with apertures 193" of the U-shaped bracket 191". (When the locking aperture 200" and aperture 193" are not aligned, the handles 194" are in their unlocked condition.) A stop pin 202", similar to but longer than pin 202, is placed through aligned locking apertures 200" and apertures 193" to maintain the handles 194" in the locked condition.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A bottom valve assembly for a tank car having a top portion, a bottom portion and a manway disposed in the top portion, the assembly comprising:

a valve seat disposed in the bottom portion of the tank car and defining an outlet opening;

a plug moveable between closed and open positions relative to the outlet opening, wherein in the closed position, the plug is disposed against the seat to form a substantially liquid-tight seal;

a link pivotally coupled to the manway;

operating linkage coupled to the plug and pivotally coupled to the link; and a lever fixedly secured to the link, the link coupling the lever to the operating linkage, wherein movement of the lever causes the plug to be moved between the open and closed positions.

2. The assembly of claim 1, wherein the lever is moveable between a locked condition and an unlocked condition, and further comprising a stop catch disposed to trap the lever in its locked condition and prevent movement of the lever in a plug-opening direction.

3. The assembly of claim 2, wherein the operating linkage includes a variable length portion for varying the length of the operating linkage, wherein when the lever is in the locked condition, the length of the operating linkage is compressed and wherein when the lever is untrapped from the stop catch, the length of the operating linkage is decompressed and lengthened causing the link and lever to move.

4. The assembly of claim 3, wherein the variable length portion has minimum and maximum lengths and includes structure biasing the variable length portion toward its maximum length, wherein when the lever is in the locked condition, the biasing structure biases the plug toward the closed position.

5. The assembly of claim 3, wherein the operating linkage includes a bowed tie rod.

6. The assembly of claim 3, wherein the operating linkage includes a pair of laterally spaced apart and bowed tie rods.

7. The assembly of claim 3, wherein the operating linkage includes biasing structure and elongated first and second tubes, the second tube having first and second ends wherein the first tube is disposed in and extends out of the first end of the second tube and the biasing structure biases the first tube away from the first end of the second tube.

8. The assembly of claim 1, wherein the lever is generally C-shaped, wherein in the locked condition the lever is disposed within the manway.

9. The assembly of claim 1, and further comprising a latch having latched and unlatched conditions, wherein in the latched condition the latch prevents movement of the plug from its closed position; and a secondary operating linkage coupled to the latch for moving the latch from the latched condition.

10. The assembly of claim 9, wherein the secondary operating linkage includes a moveable handle having a first position relative to the manway when the plug is in the closed position and a second position when the plug is in the open position, whereby an observer at the manway can determine if the plug is in the closed position.

11. The assembly of claim 1 and further comprising a stop latch pivotally coupled to the link and moveable between locked and unlocked positions, wherein when the stop latch is in the locked position, the stop latch prevents movement of the lever and the plug in a plug-closing direction.

12. The assembly of claim 11 and further comprising a hinge bracket coupled to the manway and having a first engaging surface, wherein the link is pivotally mounted to the bracket and the stop latch has a second engaging surface, wherein when the latch is in the locked position, the second engaging surface is engaged with the first engaging surface.

13. The assembly of claim 12, wherein the first engaging surface has first and second portions, the first portion disposed closer to the manway than the second portion, the second portion sloping upwardly in a direction from the bottom portion to the top portions of the tank car.

14. The assembly of claim 13, wherein the second engaging surface has a sloped portion engageable with the second portion of the first engaging surface.

15. The assembly of claim 1, wherein the link is L-shaped and has two arms forming an angle of about 90 degrees.

16. A bottom valve assembly for a tank car having a top portion, a bottom portion, and a manway disposed in the top portion, the assembly comprising:
 a valve seat disposed in the bottom portion of the tank car defining an outlet opening;
 a plug moveable between closed and open positions, wherein in the closed position, the plug is disposed against the seat to form a substantially liquid-tight seal;
 operating linkage coupled to the plug and including biasing structure biasing the plug towards the closed position;
 a lever coupled to the manway and to the linkage, wherein movement of the lever causes the plug to be moved between the open and closed positions;
 a latch having latched and unlatched conditions, wherein in the latched condition the latch abuts and is in contact with the plug and prevents movement of the plug from its closed position; and
 a secondary operating linkage coupled to the latch for moving the latch from the latched condition.

17. The assembly of claim 16, wherein the secondary operating linkage includes a moveable handle having a first position relative to the manway when the plug is in the closed position and a second position when the plug is in the open position, the handle being unbiased to the first position whereby an observer at the manway can determine if the plug is in the closed position.

18. The assembly of claim 17, wherein the manway has a bottom portion, wherein when the moveable handle is in its first position, the handle is disposed within the manway and when the handle is in its second position, the handle is disposed above the manway.

19. The assembly of claim 16, and further comprising a tubular nozzle projecting from the bottom portion and communicating with the outlet opening and having a terminal end defining a seat and having a valve opening, the tubular nozzle including a keeper disposed at the terminal end; an outlet cap movable between closed and open positions, wherein in the closed position the cap and seat form a liquid-tight seal; and handles pivotally coupled to the cap, the handle being pivotable between locked and unlocked conditions and including a hook wherein when the hook is disposed in the keeper and the lock is moved to the locked condition, the outlet cap is placed in the closed position.

20. The assembly of claim 19, and further comprising a slide assembly coupled to the nozzle, the outlet cap being movably coupled to the slide assembly, wherein the outlet cap is movable relative to the slide assembly between the open and closed positions.

21. The assembly of claim 16, and further comprising an auxiliary extension structure coupled to the latch to allow a user to couple an associated tool from the manway to move the latch from the latched condition.

22. The assembly of claim 21, wherein the latch include two generally L-shaped legs respectively having exterior sides and interior sides facing each other, the auxiliary extension structure including two extensions respectively having portions disposed on the exterior side of an associated L-shaped leg.

23. The assembly of claim 16 and further comprising a guide assembly for guiding the operating linkage, the latch removeably coupled to the guide assembly.

24. A bottom valve assembly for a tank car having a top portion and a bottom portion, the assembly comprising,:
 a tank outlet opening disposed in the bottom portion of the tank;
 a tubular nozzle projecting from the bottom portion and communicating with the tank outlet opening and having a terminal end defining a seat spaced from the tank outlet opening and having a valve opening, the tubular nozzle including a keeper disposed at the terminal end;
 an outlet cap movable between closed and open positions, wherein in the closed position the cap and seat form a liquid-tight seal; and
 a handle pivotally coupled to the cap, the handle being pivotally movable between locked and unlocked conditions and including a hook wherein when the hook is disposed in the keeper and the lock is moved to the locked condition, the outlet cap is placed in the closed position.

25. The assembly of claim 24, and further comprising a slide assembly coupled to the nozzle, the outlet cap being coupled to the slide assembly for movement relative to the slide assembly between the open and closed positions.

26. The assembly of claim 25, wherein the slide assembly is pivotally coupled to the nozzle, wherein when the outlet cap is in the open position, the outlet cap can be pivoted from beneath the valve opening so as not to interfere with the flow of fluid from the valve opening.

27. The assembly of claim 24, wherein the handle includes a hand-engaging portion and the hook is pivotally coupled to the hand-engaging portion.

* * * * *